US011073869B2

(12) United States Patent
Ahn et al.

(10) Patent No.: US 11,073,869 B2
(45) Date of Patent: Jul. 27, 2021

(54) ELECTRONIC DEVICE WITH COATING FOR PROTECTION OF WINDOW

(71) Applicant: SAMSUNG ELECTRONICS CO., LTD., Suwon-si (KR)

(72) Inventors: Sungho Ahn, Suwon-si (KR); Jonghae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/833,887

(22) Filed: Mar. 30, 2020

(65) Prior Publication Data

US 2020/0310494 A1 Oct. 1, 2020

(30) Foreign Application Priority Data

Mar. 29, 2019 (KR) .......................... 10-2019-0037090
Feb. 11, 2020 (KR) .......................... 10-2020-0016448

(51) Int. Cl.
 *G06F 1/16* (2006.01)
 *B32B 17/06* (2006.01)
 *G06F 3/041* (2006.01)

(52) U.S. Cl.
 CPC .......... *G06F 1/1652* (2013.01); *B32B 17/064* (2013.01); *G06F 1/1641* (2013.01);
 (Continued)

(58) Field of Classification Search
 None
 See application file for complete search history.

(56) References Cited

U.S. PATENT DOCUMENTS 8,003,195 B2* 8/2011 Lee ............... H01L 29/66765
 428/166
8,934,227 B2* 1/2015 Cheon ............... H05K 5/02
 361/679.21
(Continued)

FOREIGN PATENT DOCUMENTS

KR  10-2015-0028647 A  3/2015
KR     10-1574923     12/2015
(Continued)

OTHER PUBLICATIONS

International Search Report for PCT/KR2020/004373 dated Jul. 15, 2020 with Translation.
(Continued)

*Primary Examiner* — Anthony Q Edwards
*Assistant Examiner* — Rashen E Morrison
(74) *Attorney, Agent, or Firm* — Nixon & Vanderhye P.C.

(57) ABSTRACT

Disclosed is an electronic device. The electronic device according to an embodiment includes: a deformable display panel; a first window disposed on the deformable display panel; a first adhesive disposed between the deformable display panel and the first window; a second window disposed on the first window, the second window including a first surface, a second surface opposite the first surface, and a side surface disposed between the first surface and the second surface; a second adhesive disposed between the first window and the second window; and a shatterproof coating (SPC) provided on at least a part of the side surface of the second window and the first surface of the second window.

20 Claims, 26 Drawing Sheets

(52) U.S. Cl.
CPC ...... *G06F 3/0412* (2013.01); *B32B 2307/546* (2013.01); *B32B 2307/584* (2013.01); *G06F 2200/1633* (2013.01)

(56) References Cited

U.S. PATENT DOCUMENTS

| | | | |
|---|---|---|---|
| 9,059,119 B2* | 6/2015 | Sung | H01L 51/0096 |
| 9,276,055 B1* | 3/2016 | Son | H01L 27/323 |
| 9,287,329 B1* | 3/2016 | Lee | H01L 51/0097 |
| 9,349,758 B2* | 5/2016 | Ki | H01L 51/0097 |
| 9,356,087 B1* | 5/2016 | Lee | H01L 27/3209 |
| 9,379,355 B1* | 6/2016 | Lee | B32B 5/18 |
| 9,383,768 B1* | 7/2016 | Menon | G06F 1/1656 |
| 9,425,418 B2* | 8/2016 | Kwon | H01L 27/3276 |
| 9,450,038 B2* | 9/2016 | Kwon | H01L 27/3248 |
| 9,490,312 B2* | 11/2016 | Lee | H01L 51/0097 |
| 9,535,522 B2* | 1/2017 | Ahn | G09G 3/3208 |
| 9,627,463 B2* | 4/2017 | Kwon | H01L 27/3276 |
| 9,706,607 B2* | 7/2017 | Kim | H01L 51/0097 |
| 9,780,157 B2* | 10/2017 | Kwon | H01L 27/124 |
| 9,793,334 B2* | 10/2017 | Park | H01L 27/3276 |
| 9,935,281 B2* | 4/2018 | Kim | H01L 27/3276 |
| 10,007,369 B1* | 6/2018 | Noh | F16B 11/006 |
| 10,020,462 B1* | 7/2018 | Ai | H01L 51/524 |
| 10,103,179 B2* | 10/2018 | Kwon | H01L 51/0097 |
| 10,199,445 B2* | 2/2019 | Kwon | H01L 51/5237 |
| 10,230,063 B2* | 3/2019 | Jang | B32B 15/09 |
| 10,259,978 B2* | 4/2019 | Kim | C09J 4/06 |
| 10,324,560 B2 | 6/2019 | Kim | |
| 10,411,084 B2* | 9/2019 | Yeo | H01L 27/3288 |
| 10,488,571 B2* | 11/2019 | Jeong | G02B 5/3033 |
| 10,545,537 B2 | 1/2020 | Ahn et al. | |
| 2009/0225258 A1* | 9/2009 | Yanagihara | G02F 1/133528 349/96 |
| 2010/0110354 A1* | 5/2010 | Suzuki | C09J 171/02 349/122 |
| 2011/0050657 A1* | 3/2011 | Yamada | H01L 51/5237 345/204 |
| 2011/0159262 A1* | 6/2011 | Negishi | B32B 27/308 428/215 |
| 2011/0250460 A1* | 10/2011 | Banba | C08L 71/02 428/429 |
| 2011/0254790 A1* | 10/2011 | Suzuki | B32B 27/34 345/173 |
| 2012/0314383 A1* | 12/2012 | Oohira | G02F 1/13452 361/749 |
| 2014/0132488 A1* | 5/2014 | Kim | G06F 1/1637 345/76 |
| 2014/0186604 A1* | 7/2014 | Kim | C08G 18/3206 428/220 |
| 2015/0010742 A1* | 1/2015 | Han | B32B 27/36 428/215 |
| 2015/0207102 A1* | 7/2015 | Jeong | H04M 1/0268 257/40 |
| 2015/0234430 A1* | 8/2015 | Gupta | G06F 1/1643 345/174 |
| 2016/0372701 A1* | 12/2016 | Kwon | G02B 1/14 |
| 2017/0126865 A1* | 5/2017 | Lee | H04M 1/0266 |
| 2017/0155084 A1* | 6/2017 | Park | H01L 27/323 |
| 2017/0192462 A1 | 7/2017 | Kim et al. | |
| 2017/0235176 A1* | 8/2017 | Oishi | B60K 35/00 349/12 |
| 2017/0253769 A1* | 9/2017 | Cho | C09J 7/10 |
| 2017/0306194 A1* | 10/2017 | Kwak | B32B 27/08 |
| 2018/0059822 A1* | 3/2018 | Seo | G06F 3/04166 |
| 2018/0097199 A1* | 4/2018 | Jo | H01L 27/3276 |
| 2018/0364759 A1* | 12/2018 | Ahn | B32B 3/263 |
| 2019/0080634 A1 | 3/2019 | Mao | |
| 2019/0196550 A1 | 6/2019 | Kim et al. | |
| 2020/0136066 A1* | 4/2020 | Jin | H01L 27/323 |
| 2020/0136069 A1* | 4/2020 | Paek | B32B 27/06 |
| 2020/0157386 A1* | 5/2020 | Kim | C09J 7/29 |

FOREIGN PATENT DOCUMENTS

| | | | |
|---|---|---|---|
| KR | 10-2016-0150007 | 12/2016 | |
| KR | 10-1713433 B1 | 3/2017 | |
| KR | 10-2017-0082430 | 7/2017 | |
| KR | 10-2017-0085420 | 7/2017 | |
| KR | 10-2017-0113815 A | 10/2017 | |
| KR | 10-2017-0122554 A | 11/2017 | |
| KR | 10-2018-0047609 | 5/2018 | |
| KR | 10-2018-0061564 A | 6/2018 | |
| KR | 10-2018-0132455 | * 10/2018 | ............ B32B 17/06 |

OTHER PUBLICATIONS

Written Opinion for PCT/KR2020/004373 dated Jul. 15, 2020.
Extended European Search Report dated Jan. 28, 2021 for EP Application No. 20722989.9.

* cited by examiner

ELECTRONIC DEVICE WITH COATING FOR PROTECTION OF WINDOW

CROSS-REFERENCE TO RELATED APPLICATIONS

This application is based on and claims priority under 35 U.S.C. § 119 to Korean Patent Application No. 10-2019-0037090, filed on Mar. 29, 2019, in the Korean Intellectual Property Office, and Korean Patent Application No. 10-2020-0016448, filed on Feb. 11, 2020, in the Korean Intellectual Property Office, the disclosures of which are incorporated by reference herein in their entireties.

BACKGROUND

1) Field

The disclosure relates to an electronic device. For example, various embodiments relate to an electronic device with a coating for protection of a display window.

2) Description of Related Art

An electronic device may include at least one display. To provide a wider screen, efforts are being undertaken to enlarge a size of a display region of the display included in the electronic device. For example, an electronic device with a deformable display panel such as a foldable display panel, a rollable display panel, an extendable display panel, or a flexible display panel has been developed.

The electronic device may include a deformable display panel and at least one window for protecting the deformable display panel. A thickness of the at least one window may be thinner than that of at least another window for protecting a non-deformable display panel to be deformed according to deformation of the deformable display panel. Thus, a plan for protecting the at least one window for protecting the deformable display panel may be required.

The above information is presented as background information only to assist with an understanding of the disclosure. No determination has been made, and no assertion is made, as to whether any of the above might be applicable as prior art with regard to the disclosure.

SUMMARY

According to an example embodiment, an electronic device includes: a deformable display panel; a first window disposed on the deformable display panel; a first adhesive disposed between the deformable display panel and the first window; a second window disposed on the first window, the second window including a first surface, a second surface opposite the first surface, and a side surface disposed between the first surface and the second surface; a second adhesive disposed between the first window and the second window; and a shatterproof coating (SPC) applied to at least a part of the side surface of the second window and the first surface of the second window.

According to an example embodiment, an electronic device includes: a deformable display panel; a first window disposed on the deformable display panel, the first window including a first surface, a second surface opposite the first surface, and a side surface disposed between the first surface and the second surface; a first adhesive disposed between the deformable display panel and the first window; a shatterproof coating (SPC) applied to at least a part of the side surface of the second window and the first surface of the second window, wherein the a second window is disposed on the first window; and a second adhesive is disposed between the first window and the second window.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
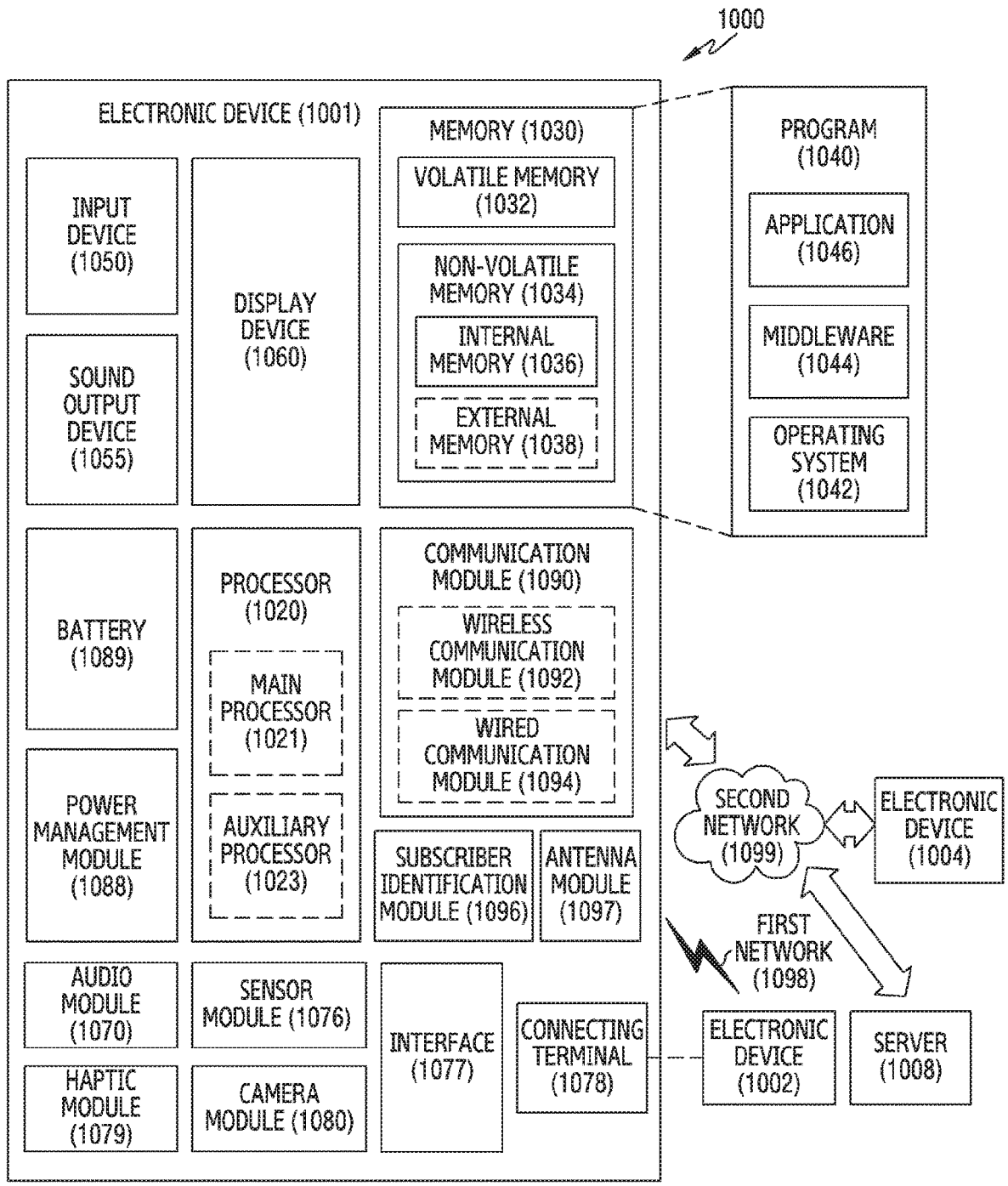
FIG. 1 is a block diagram illustrating an example electronic device in a network environment according to an embodiment.

FIG. 1 is a block diagram illustrating an example electronic device 1001 in a network environment 1000 according to an embodiment. Referring to FIG. 1, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 2:
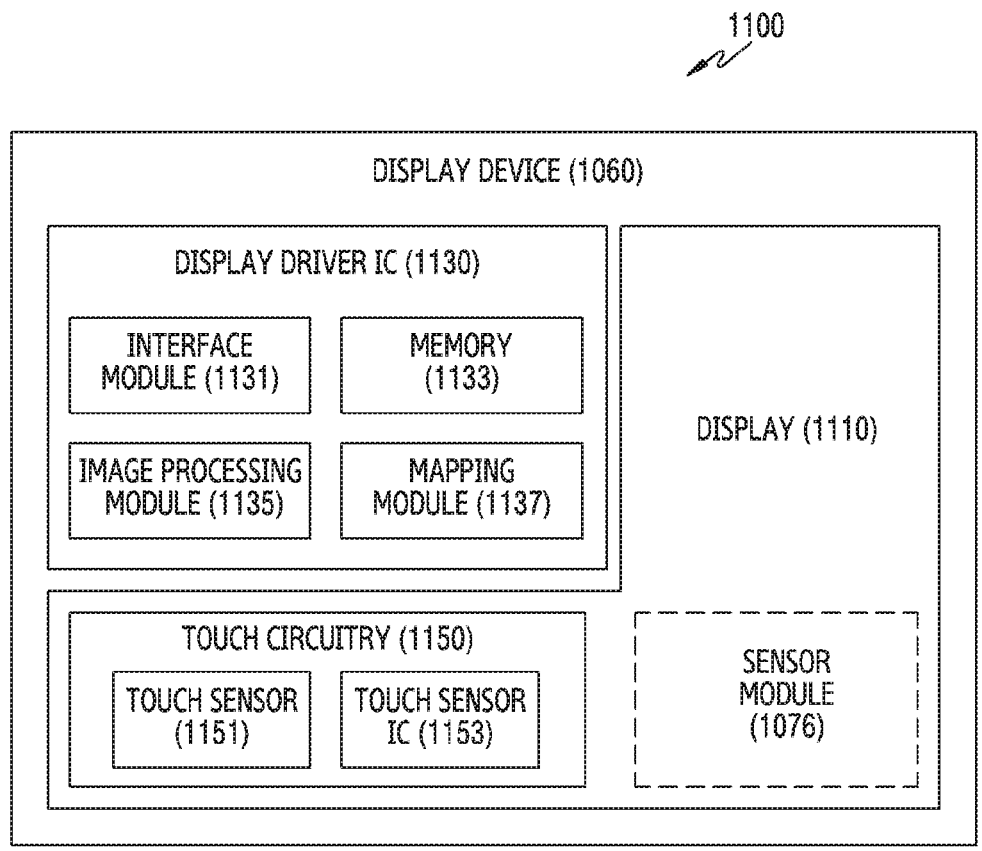
FIG. 2 is a block diagram illustrating an example display according to an embodiment.

FIG. 2 is a block diagram 1100 illustrating an example display device 1060 according to an embodiment. Referring to FIG. 2, the display device 1060 may include a display 1110 and a display driver integrated circuit (DDI) 1130 to control the display 1110. The DDI 1130 may include an interface module 1131, memory 1133 (e.g., buffer memory), an image processing module 1135, or a mapping module 1137. The DDI 1130 may receive image information that contains image data or an image control signal corresponding to a command to control the image data from another component of the electronic device 1001 via the interface module 1131. For example, according to an embodiment, the image information may be received from the processor 1020 (e.g., the main processor 1021 (e.g., an application processor)) or the auxiliary processor 1023 (e.g., a graphics processing unit) operated independently from the function of the main processor 1021. The DDI 1130 may communicate, for example, with touch circuitry 1050 or the sensor module 1076 via the interface module 1131. The DDI 1130 may also store at least part of the received image information in the memory 1133, for example, on a frame by frame basis.

The image processing module 1135 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 1110.

The mapping module 1137 may generate a voltage value or a current value corresponding to the image data pre-processed or post-processed by the image processing module 1135. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 1110 may be driven, for example, based at least in part on the voltage value or the current value such that visual information (e.g., a text, an image, or an icon) corresponding to the image data may be displayed via the display 1110.

According to an embodiment, the display device 1060 may further include the touch circuitry 1150. The touch circuitry 1150 may include a touch sensor 1151 and a touch sensor IC 1153 to control the touch sensor 1151. The touch sensor IC 1153 may control the touch sensor 1151 to sense a touch input or a hovering input with respect to a certain position on the display 1110. To achieve this, for example, the touch sensor 1151 may detect (e.g., measure) a change in a signal (e.g., a voltage, a quantity of light, a resistance, or a quantity of one or more electric charges) corresponding to the certain position on the display 1110. The touch circuitry 1150 may provide input information (e.g., a position, an area, a pressure, or a time) indicative of the touch input or the hovering input detected via the touch sensor 1151 to the processor 1020. According to an embodiment, at least part (e.g., the touch sensor IC 1153) of the touch circuitry 1150 may be formed as part of the display 1110 or the DDI 1130, or as part of another component (e.g., the auxiliary processor 1023) disposed outside the display device 1060.

According to an embodiment, the display device 1060 may further include at least one sensor (e.g., a fingerprint sensor, an iris sensor, a pressure sensor, or an illuminance sensor) of the sensor module 1076 or a control circuit for the at least one sensor. In such a case, the at least one sensor or the control circuit for the at least one sensor may be embedded in one portion of a component (e.g., the display 1110, the DDI 1130, or the touch circuitry 1050)) of the display device 1060. For example, when the sensor module 1076 embedded in the display device 1060 includes a biometric sensor (e.g., a fingerprint sensor), the biometric sensor may obtain biometric information (e.g., a fingerprint image) corresponding to a touch input received via a portion of the display 1110. As another example, when the sensor module 1076 embedded in the display device 1060 includes a pressure sensor, the pressure sensor may obtain pressure information corresponding to a touch input received via a partial or whole area of the display 1110. According to an embodiment, the touch sensor 1151 or the sensor module 1076 may be disposed between pixels in a pixel layer of the display 1110, or over or under the pixel layer.

Figure 3A:
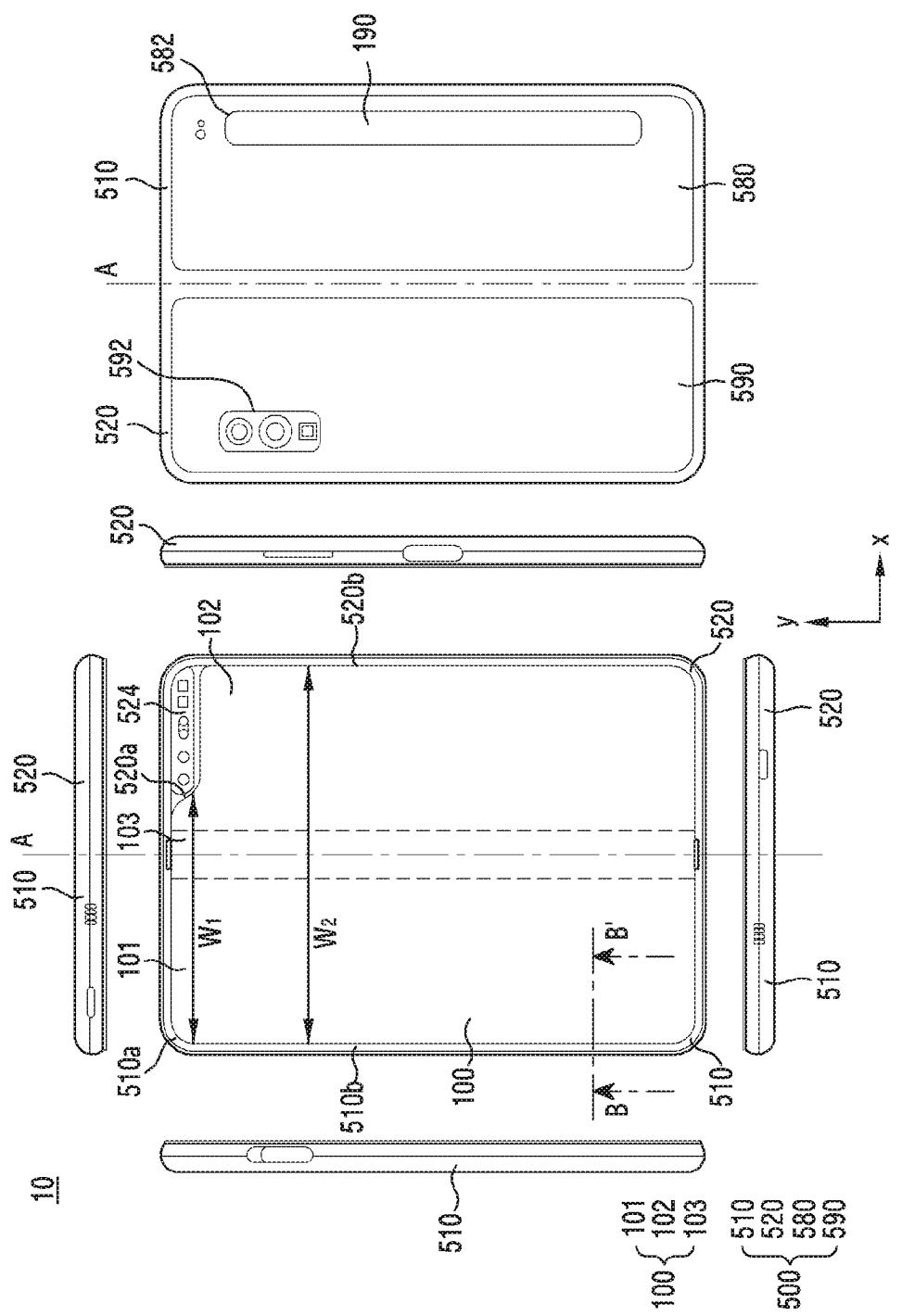
FIG. 3A is a diagram illustrating an example electronic device in an unfolded state according to an embodiment.
Figure 3B:
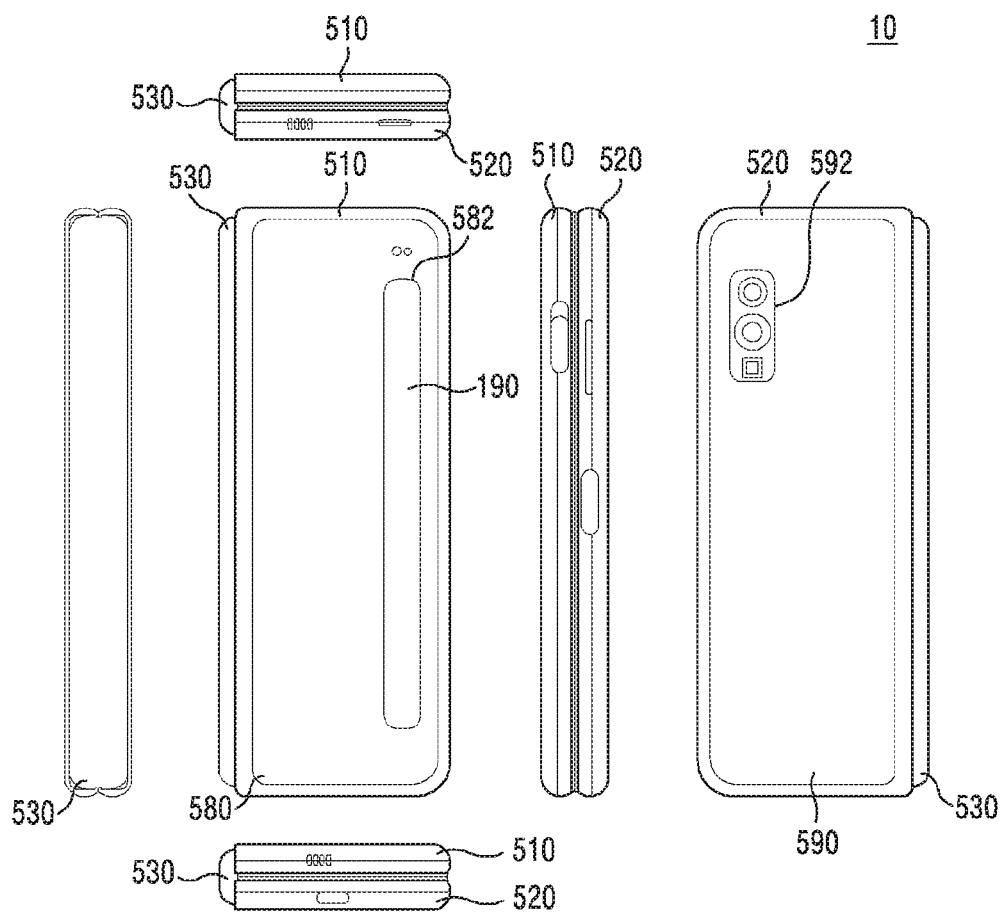
FIG. 3B is a diagram illustrating a folded state of the electronic device according to an embodiment.

FIG. 3A is a diagram illustrating an example electronic device in an unfolded state according to an embodiment, and FIG. 3B is a diagram illustrating the example electronic device in a folded state according to an embodiment.

An electronic device 10 of FIGS. 3A and 3B may be identical or similar to the electronic device 1001 of FIG. 1.

Referring to FIGS. 3A and 3B, in an embodiment, the electronic device 10 may include a foldable housing 500, a hinge cover 530 that covers a foldable portion of the foldable housing 500, and a flexible, foldable, or deformable display 100 (hereinafter abbreviated to "display 100") that is disposed in a space formed by the foldable housing 500.

Herein, a surface on which the display 100 is disposed is defined as a first surface, or a front surface of the electronic device 10. A surface opposite to the front surface is defined as a second surface, or a rear surface of the electronic device 10. Further, a surface that surrounds a space between the front surface and the rear surface is defined as a third surface, or a side surface of the electronic device 10.

In an embodiment, the foldable housing 500 may include a first housing structure 510, a second housing structure 520 that includes a sensor region 524, a first rear cover 580, and a second rear cover 590. The foldable housing 500 of the electronic device 10 is not limited to a shape and connection that are illustrated in FIG. 3A and FIG. 2, and may be realized by another shape or a combination and/or connection of components. For example, in another embodiment, the first housing structure 510 and the first rear cover 580 may be integrally formed, and the second housing structure 520 and the second rear cover 590 may be integrally formed.

In the illustrated embodiment, the first housing structure 510 and the second housing structure 520 are disposed on both sides centered on a folding axis (an axis A), and may have a shape that is symmetrical with respect to the folding axis A on the whole. As will be described below, an angle or a distance formed by the first housing structure 510 and the second housing structure 520 may be changed depending on whether a state of the electronic device 10 is an unfolded state, a folded state, or an intermediate state. In the illustrated embodiment, unlike the first housing structure 510, the second housing structure 520 further includes the sensor region 524 in which various sensors are disposed, but it may have a symmetrical shape in a region other than the sensor region 524.

In an embodiment, as illustrated in FIG. 3A, the first housing structure 510 and the second housing structure 520 may form a recess that houses the display 100 together. In the illustrated embodiment, due to the sensor region 524, the recess may have two or more widths that are different from each other in a direction perpendicular to the folding axis A.

For example, the recess may have (1) a first width w1 between a first portion 510*a* of the first housing structure 510 which is parallel to the folding axis A and a first portion 520*a* of the second housing structure 520 which is formed at a periphery of the sensor region 524, and (2) a second width w2 that is formed by a second portion 510*b* of the first housing structure 510 and a second portion 520*b* of the second housing structure 520 which is parallel to the folding axis A excluding the sensor region 524. In this case, the second width w2 may be formed to be longer than the first width w1. In other words, the first portion 510*a* of the first housing structure 510 and the first portion 520*a* of the second housing structure 520, both of which are asymmetrical in shape with each other, may form the first width w1 of the recess, and the second portion 510*b* of the first housing structure 510 and the second portion 520*b* of the second housing structure 520, both of which are symmetrical in shape with each other, may form the second width w2 of the recess. In an embodiment, the first and second portions 520*a* and 520*b* of the second housing structure 520 may be different in distance from the folding axis A from each other. The widths of the recess are not limited to the illustrated example. In an embodiment, the recess may have a plurality of widths depending on a shape of the sensor region 524 or asymmetrical portions of the first and second housing structures 510 and 520.

In an embodiment, at least a part of the first housing structure 510 and at least a part of the second housing structure 520 may be formed of a metallic or nonmetallic material having rigidity of a selected magnitude to support the display 100.

In an embodiment, the sensor region 524 may be formed to have a certain region in the neighborhood of one corner of the second housing structure 520. However, a layout, shape, and size of the sensor region 524 are not limited to the illustrated example. For example, in another embodiment, the sensor region 524 may be provided to another corner of the second housing structure 520 or in an arbitrary region between upper and lower end corners of the second housing structure 520. In an embodiment, components for performing various functions mounted in the electronic device 10 can be exposed to the first surface of the electronic device 10 through the sensor region 524 or through one or more openings provided in the sensor region 524. In an embodiment, the components may include various sensors. The sensor may include, for instance, at least one of a front camera, a receiver, or a proximity sensor.

The first rear cover 580 may be disposed on the rear surface of the electronic device at one side of the folding axis, and have, for instance, a substantially rectangular periphery, and the periphery may be surrounded by the first housing structure 510. Likewise, the second rear cover 590 may be disposed on the rear surface of the electronic device at the other side of the folding axis, and a periphery thereof may be surrounded by the second housing structure 520.

In the illustrated embodiment, the first rear cover 580 and the second rear cover 590 may be substantially symmetrical in shape with respect to the folding axis A. However, the first rear cover 580 and the second rear cover 590 are not necessarily symmetrical in shape with each other. In another embodiment, the electronic device 10 may include the first rear cover 580 and the second rear cover 590 having various shapes. In yet another embodiment, the first rear cover 580 may be formed integrally with the first housing structure 510, and the second rear cover 590 may be formed integrally with the second housing structure 520.

In an embodiment, the first rear cover 580, the second rear cover 590, the first housing structure 510, and the second housing structure 520 may form a space in which various components (e.g., a printed circuit board or a battery) of the electronic device 10 can be disposed. In an embodiment, one or more components may be disposed or visually exposed to the rear surface of the electronic device 10. For example, at least a part of a sub-display 190 may be visually exposed through a first rear region 582 of the first rear cover 580. In another embodiment, one or more components or sensors may be visually exposed through a second rear region 592 of the second rear cover 590. In an embodiment, the sensor may include a proximity sensor and/or a rear camera.

Referring to FIG. 3B, the hinge cover 530 may be disposed between the first housing structure 510 and the second housing structure 520, and be configured to cover an internal component (e.g., a hinge structure). In an embodiment, according to a state (e.g., an unfolded state or a folded state) of the electronic device 10, the hinge cover 530 may be covered by parts of the first and second housing structures 510 and 520, or be exposed to the outside.

For example, as illustrated in FIG. 3A, in a case where the electronic device 10 is in an unfolded state, the hinge cover 530 may be covered by the first housing structure 510 and the second housing structure 520, and may not be exposed. For example, as illustrated in FIG. 3B, in a case where the electronic device 10 is in a folded state (e.g., a fully folded state), the hinge cover 530 may be exposed to outside between the first housing structure 510 and the second housing structure 520. For example, in a case where the electronic device 10 is in an intermediate state in which the first housing structure 510 and the second housing structure 520 are folded with a certain angle, the hinge cover 530 may be partly exposed to the outside between the first housing structure 510 and the second housing structure 520. However, a region in which the hinge cover 530 is exposed in the intermediate state may be smaller than a region in which the hinge cover 530 is exposed in the fully folded state. In an embodiment, the hinge cover 530 may include a curved surface.

The display 100 may be disposed in a space formed by the foldable housing 500. For example, the display 100 is seated on a recess formed by the foldable housing 500, and may form most of the front surface of the electronic device 10.

Thus, the front surface of the electronic device 10 may include the display 100, and partial regions of the first and second housing structures 510 and 520 adjacent to the display 100. The rear surface of the electronic device 10 may include the first rear cover 580, a partial region of the first housing structure 510 adjacent to the first rear cover 580, the second rear cover 590, and a partial region of the second housing structure 520 adjacent to the second rear cover 590.

The display 100 may be a display in which at least a partial region can be deformed into a flat surface or a curved surface. In an embodiment, the display 100 may include a folding region 103, a first region 101 that is disposed on one side on the basis of the folding region 103 (a left side of the folding region 103 illustrated in FIG. 3A), and a second region 102 that is disposed on the other side on the basis of the folding region 103 (a right side of the folding region 103 illustrated in FIG. 3A).

The region division of the display 100 illustrated in FIG. 3A is illustrative, and the display 100 may be divided into a plurality of regions (e.g., four or more regions or two regions) according to a structure or a function. For example, in the embodiment illustrated in FIG. 3A, the region of the display 100 may be divided by the folding region 103 that extends parallel to a y axis or by the folding axis A. In another embodiment, the region of the display 100 may be divided by another folding region (e.g., a folding region parallel to an x axis) or another folding axis (e.g., a folding axis parallel to the x axis).

The first region 101 and the second region 102 may be symmetrical in shape with respect to the folding region 103 on the whole. However, unlike the first region 101, the second region 102 may include a cut notch due to the presence of the sensor region 524, but it may be symmetrical in shape with respect to the first region 101 in a region other than the cut notch. In other words, the first region 101 and the second region 102 may include portions that are symmetrical in shape with respect to each other, and portions that are asymmetrical in shape with respect to each other.

Hereinafter, an operation of the first housing structure 510, an operation of the second housing structure 520, and each region of the display 100 according to the state of the electronic device 10 (e.g., the unfolded state and the folded state) will be described.

In an embodiment, in the case where the electronic device 10 is in the unfolded state (e.g., FIG. 3A), the first housing structure 510 and the second housing structure 520 may be disposed at an angle of 180° to face the same direction.

Surfaces of the first and second regions 101 and 102 of the display 100 may form an angle of 180° relative to each other, and face the same direction (e.g., in a direction of the front surface of the electronic device). The folding region 103 may form the same flat surface as the first region 101 and the second region 102.

In an embodiment, in the case where the electronic device 10 is in the folded state (e.g., FIG. 3B), the first housing structure 510 and the second housing structure 520 may be disposed to face each other. The surfaces of the first and second regions 101 and 102 of the display 100 may form a narrow angle (e.g., between 0° and 10°) relative to each other, and face each other. The folding region 103 may be formed to have a curved surface in which at least a part thereof has a certain curvature.

In an embodiment, in the case where the electronic device 10 is in the intermediate state, the first housing structure 510 and the second housing structure 520 may be disposed at a certain angle relative to each other. The surfaces of the first and second regions 101 and 102 of the display 100 may form an angle that is greater than the folded state and is smaller than the unfolded state. The folding region 103 may be formed to have a curved surface in which at least a part thereof has a certain curvature. In this case, the curvature may be smaller than that of the folded state.

In another embodiment, the direction in which the foldable housing 500 is folded may be different from that illustrated in FIG. 3B. For example, the foldable housing 500 may be folded in a direction opposite to that illustrated in FIG. 3B. For example, in a state in which the electronic device 10 is fully folded, the rear surface of the first housing structure 510 and the rear surface of the second housing structure 520 may be disposed to face each other, and the entire display 100 may be seen outside.

In another embodiment, the foldable housing 500 of the electronic device 10 can be variously changed in design within a range in which a person having ordinary skill in the art is applicable. For example, the electronic device 10 may include a third housing structure (not illustrated), and a connection member (e.g., the hinge structure) that enables a folding operation after the third housing structure is joined with the second housing structure 520. The third housing structure may be rotated about the second housing structure 520 in a first direction (e.g., a clockwise direction), and the first housing structure 510 disposed on a side opposite to the third housing structure may be rotated about the second housing structure 520 in the same direction as the first direction (e.g., the clockwise direction) or a direction different from the first direction (e.g., in a counterclockwise direction). For another example, the foldable housing 500 may be realized as a rollable housing in which at least a portion thereof can be rolled or unrolled.

Figure 3C:
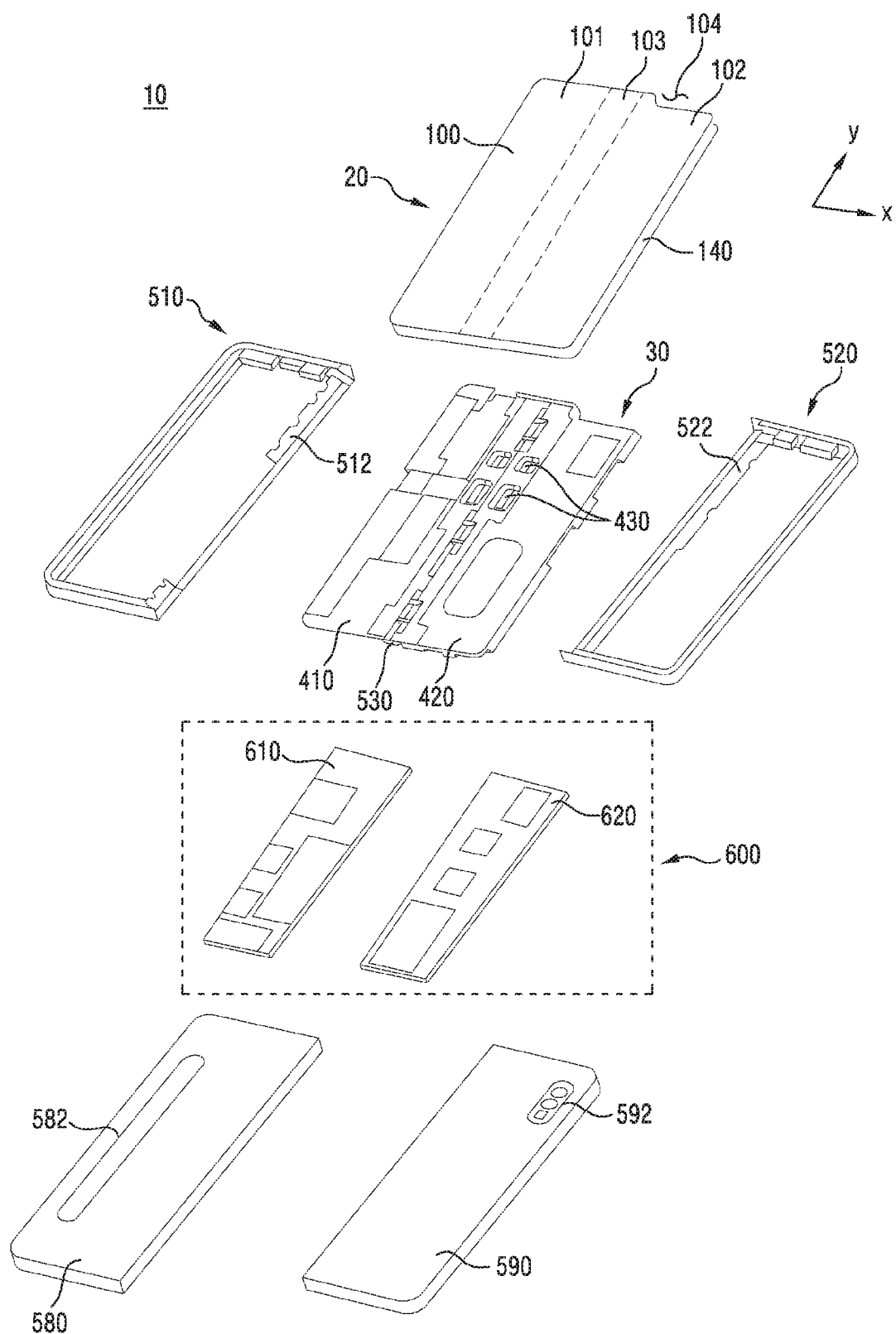
FIG. 3C is an exploded perspective view of the example electronic device according to an embodiment.

FIG. 3C is an exploded perspective view illustrating an example electronic device according to an embodiment.

Referring to FIG. 3C, in an embodiment, the electronic device 10 may include a display unit 20, a bracket assembly 30, a board 600, a first housing structure 510, a second housing structure 520, a first rear cover 580, and a second rear cover 590. The display unit 20 used herein may be referred to as a display module or a display assembly.

The display unit 20 may include, for instance, a display 100, and one or more plates or layers 140 on which the display 100 is seated. In an embodiment, the plate 140 may be disposed between the display 100 and the bracket assembly 30. The display 100 may be disposed on at least a part of one surface (e.g., an upper surface based on FIG. 3C) of the plate 140. The plate 140 may be formed in a shape corresponding to the display 100. For example, a partial region of the plate 140 may be formed in a shape corresponding to a notch 104 of the display 100.

The bracket assembly 30 may include a first bracket 410, a second bracket 420, a hinge structure that is disposed between the first bracket 410 and the second bracket 420, the hinge cover 530 that covers the hinge structure when viewed from the outside, and wiring members 430 (e.g., flexible printed circuits (FPCs)) that cross the first bracket 410 and the second bracket 420.

In an embodiment, the bracket assembly 30 may be disposed between the plate 140 and the board 600. For example, the first bracket 410 may be disposed between the first region 101 of the display 100 and a first board 610. The second bracket 420 may be disposed between the second region 102 of the display 100 and a second board 620.

In an embodiment, the wiring members 430 and at least a part of the hinge structure 300 may be disposed inside the bracket assembly 30. The wiring members 430 may be disposed in a direction (e.g., an x-axis direction) across the first bracket 410 and the second bracket 420. The wiring members 430 may be disposed in the direction (e.g., the x-axis direction) perpendicular to the folding axis (e.g., the y axis or the folding axis A of FIG. 3A) of the folding region 103 of the electronic device 10.

As described above, the board 600 may include the first board 610 that is disposed on a side of the first bracket 410, and the second board 620 that is disposed on a side of the second bracket 420. The first board 610 and the second board 620 may be disposed in a space defined by the bracket assembly 30, the first housing structure 510, the second housing structure 520, the first rear cover 580, and the second rear cover 590. Components for realizing various functions of the electronic device 10 may be mounted on the first board 610 and the second board 620.

The first housing structure 510 and the second housing structure 520 may be assembled with each other to be joined from both sides of the bracket assembly 30 in a state in which the display unit 20 is joined to the bracket assembly 30. As will be described below, the first housing structure 510 and the second housing structure 520 may be joined with the bracket assembly 30 by sliding on both the sides of the bracket assembly 30.

In an embodiment, first housing structure 510 may include a first rotary support face 512, and the second housing structure 520 may include a second rotary support face 522 corresponding to the first rotary support face 512. The first rotary support face 512 and the second rotary support face 522 may include curved surfaces corresponding to the curved surface included in the hinge cover 530.

In an embodiment, when the electronic device 10 is in the unfolded state (e.g., the electronic device of FIG. 3A), the first rotary support face 512 and the second rotary support face 522 may cover the hinge cover 530, and the hinge cover 530 may not be exposed to the rear surface of the electronic device 10, or may be minimally exposed to the rear surface of the electronic device 10. When the electronic device 10 is in the folded state (e.g., the electronic device of FIG. 3B), the first rotary support face 512 and the second rotary support face 522 may be rotated along the curved surface included in the hinge cover 530, and the hinge cover 530 may be maximally exposed to the rear surface of the electronic device 10.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4A:
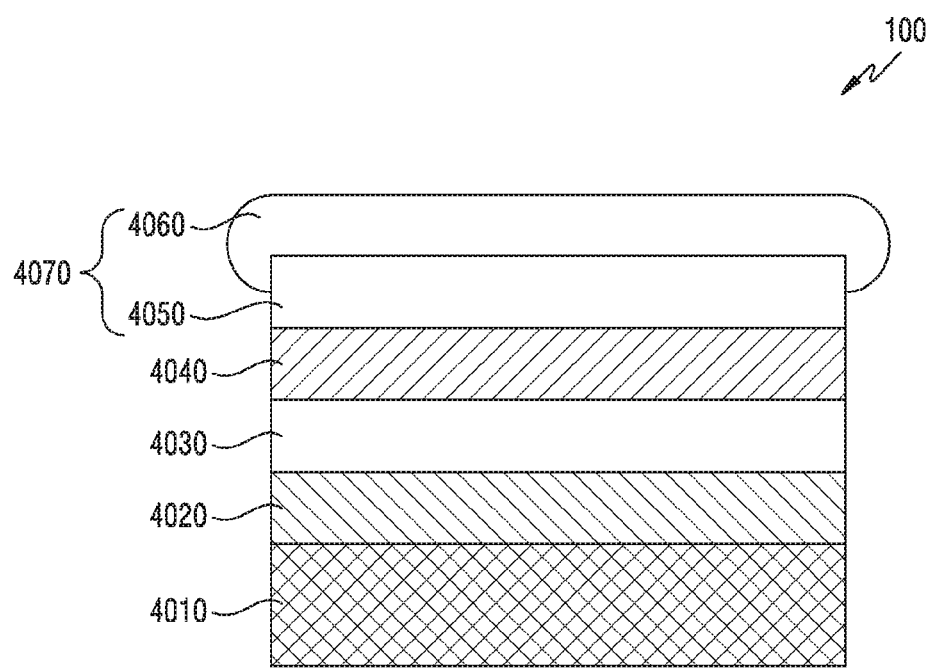
FIG. 4A is a sectional view of an example display of the electronic device according to an embodiment.

FIG. 4A is a sectional view illustrating an example of the display 100 of the electronic device according to an embodiment.

Figure 4B:
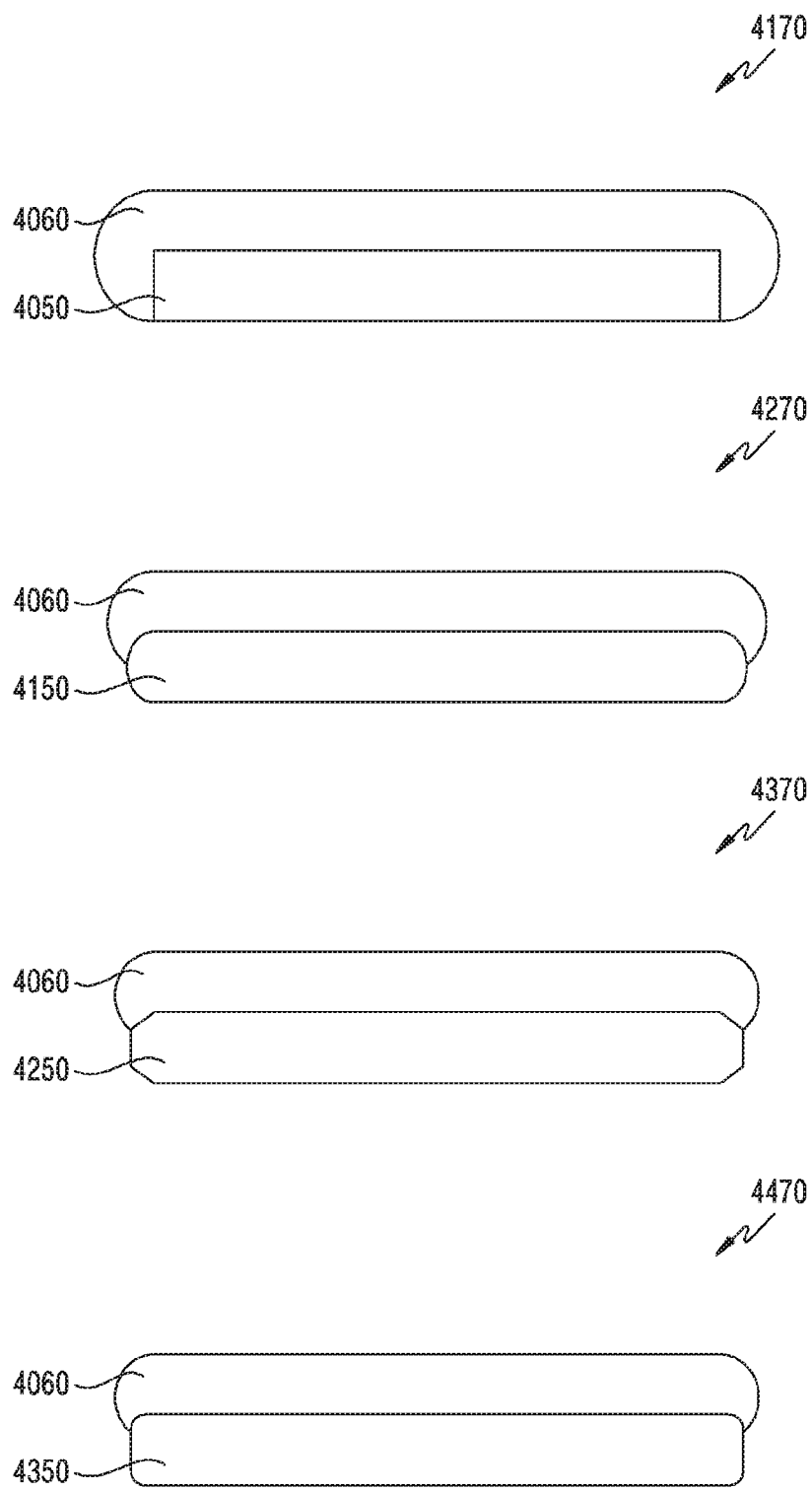
FIG. 4B is a diagram illustrating examples of a protection layer according to an embodiment.

FIG. 4B is a diagram illustrating examples of a protection layer according to an embodiment.

Figure 5A:
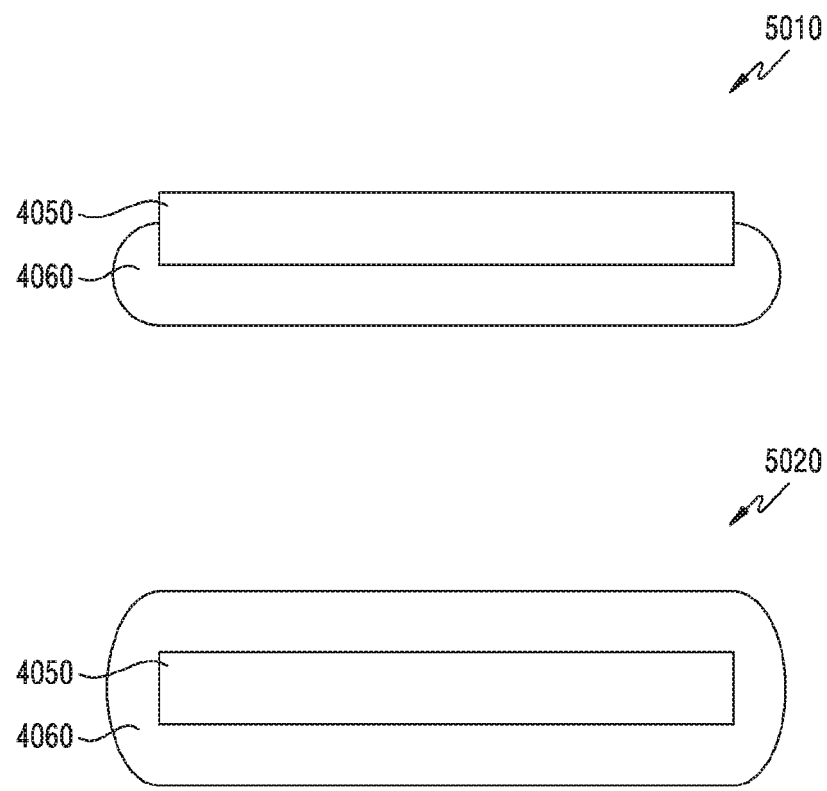
FIG. 5A is a diagram illustrating additional examples of the protection layer according to an embodiment.
Figure 5B:
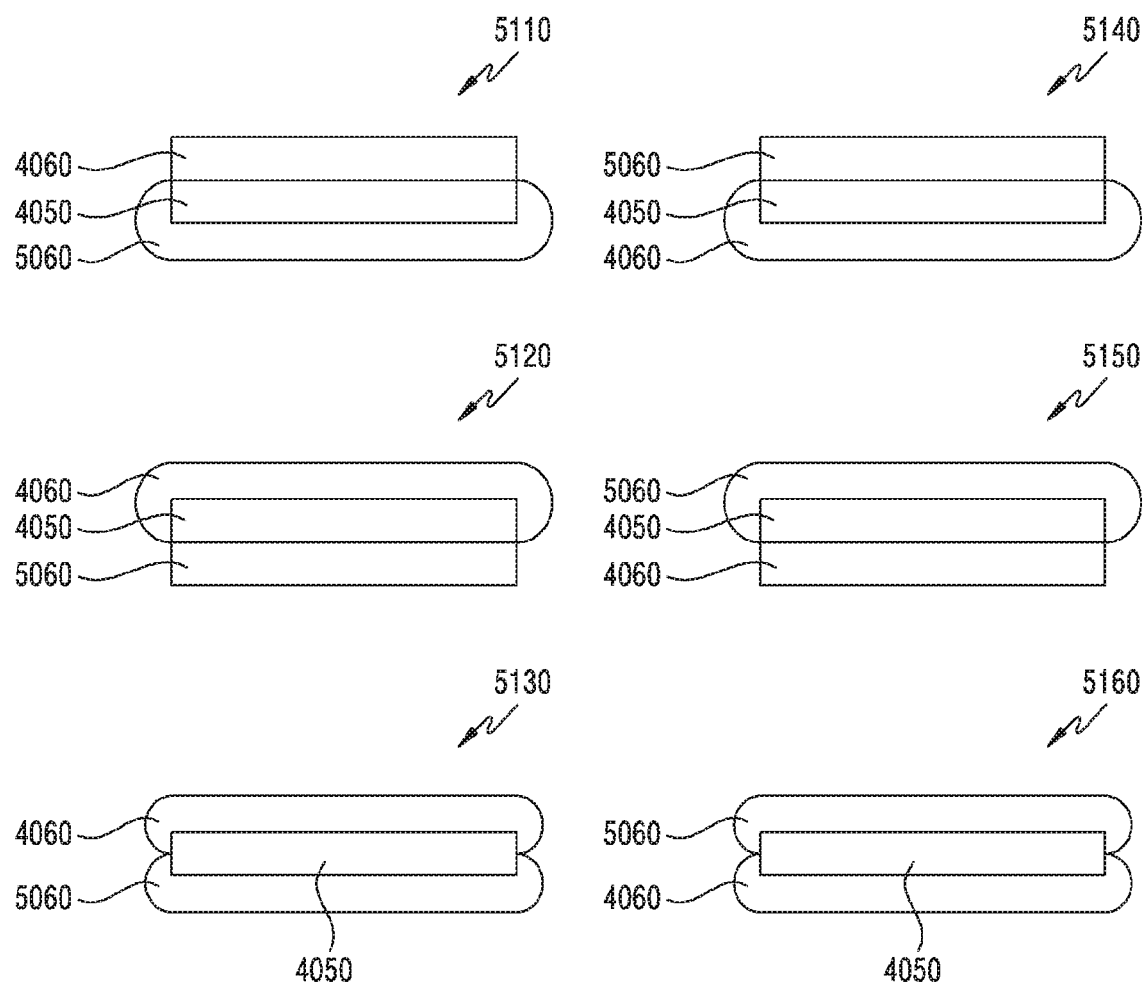
FIG. 5B is a diagram illustrating other examples of the protection layer according to an embodiment.
Figure 5C:
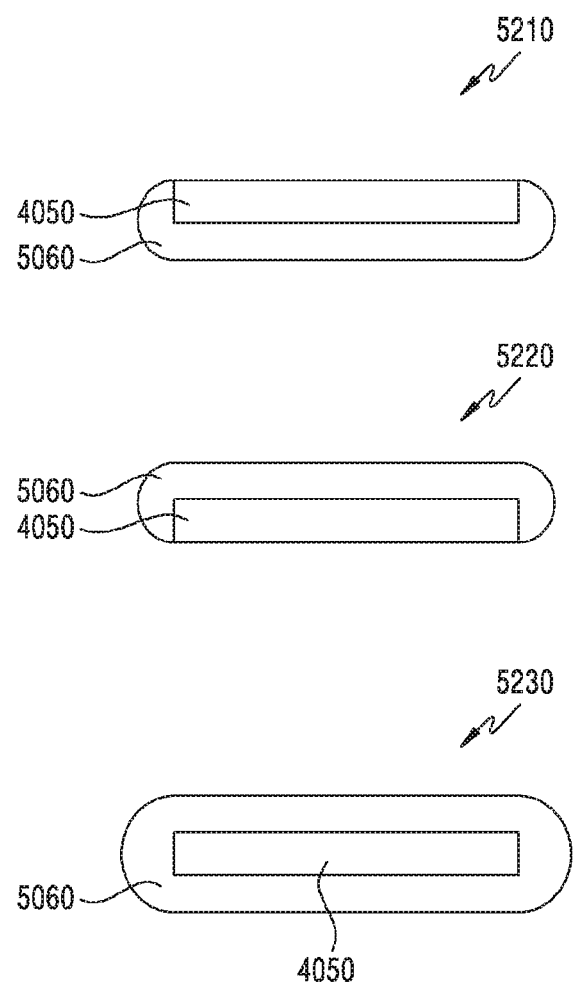
FIG. 5C is a diagram illustrating further examples of the protection layer according to an embodiment.

FIG. 5A is a diagram illustrating examples of the protection layer according to an embodiment, FIG. 5B is a diagram illustrating examples of the protection layer according to an embodiment, and FIG. 5C is a diagram illustrating examples of the protection layer according to an embodiment.

Referring to FIG. 4A, the display 100 of the electronic device (e.g., an electronic device 1001) according to an embodiment may include at least one of a display panel 4010, a first adhesive 4020, a first window 4030, a second adhesive 4040, a second window 4050, and/or a shatterproof coating (SPC) 4060.

In an embodiment, the display panel 4010 may be a deformable display panel. For example, the display panel 4010 may include, for example, and without limitation, a rollable display panel, an extendable display panel, a foldable display panel, a flexible display panel, or the like.

In an embodiment, the display panel 4010 may include a cover panel (C-panel) for protecting the display panel 4010, a base board, a thin film transistor (TFT) layer that is formed on the base board, a pixel layer (or an organic light emitting layer) to which a signal voltage is applied from the TFT layer, and a polarizing layer that is disposed on the pixel layer. The display panel 4010 may further include arbitrary elements such as a thin film encapsulation (TFE) layer that encapsulates the pixel layer, a back film for supporting the base board, and so on. In an embodiment, the base board is formed of a polymer material (e.g., polyimide (PI)) to be able to secure flexibility of the board, but it is not limited thereto. In an embodiment, the board may include at least one of polyethylene terephthalate, polymethylmethacrylate, polyamide, polyimide, polypropylene, or polyurethane. In an embodiment, the board may be formed of a plurality of layers. In an embodiment, the polarizing layer gives directivity to light emitted from the display panel 4010 (e.g., the pixel layer), and thereby a resolution of an image displayed through the display panel 4010 can be improved.

In an embodiment, the first window 4030 may be disposed above the display panel 4010. In an embodiment, the first window 4030 may include, for example, and without limitation, at least one of polyimide (PI), polyethylene terephthalate (PET), polyurethane (PU), cellulose triacetate (TAC), ultra thin glass (UTG), or the like, but it is not limited thereto.

In an embodiment, the first window 4030 may include a plurality of layers. For example, the first window 4030 may include at least one layer including UTG or a polymer material (e.g., PI, PET, PU and/or TAC). For example, the first window 4030 may further include a coating layer on at least a part of a first surface of the first window 4030 or a second surface of the first window 4030 which is opposite to the first surface. For another example, in the case where the first window 4030 includes the plurality of layers, at least one coating layer may be further included between the plurality of layers of the first window 4030.

In an embodiment, the first window 4030 may be produced by, for example, and without limitation, a slimming method of cutting out a thick glass using a chemical process (e.g., etching), a surface noncontact type fusion method of dropping and cooling a glass solution in the air and forming a glass substrate, a roller method of pouring and extruding a glass solution between two rollers, or the like, but it is not limited thereto. For example, the first window 4030 may be produced by widely known various methods that are widely known.

In an embodiment, the first window 4030 may be referred to as a lower window in view of being disposed below the second window 4050 (to be described below).

In an embodiment, the first adhesive 4020 may be interposed between the display panel 4010 and the first window 4030. For example, the first window 4030 may be adhered above the display panel 4010 via the first adhesive 4020.

In an embodiment, the first adhesive 4020 may include, for example, and without limitation, at least one of an optical clear adhesive (OCA), an optical clear resin (OCR), a pressure sensitive adhesive (PSA), or the like.

In an embodiment, the second window 4050 may be disposed above the first window 4030. In an embodiment, the second window 4050 may include a first surface (e.g., an upper surface), a second surface (e.g., a lower surface) that is opposite to the first surface, and a side surface that is disposed between the first surface and the second surface. In an embodiment, the second window 4050 may include, for example, and without limitation, at least one of polyimide (PI), polyethylene terephthalate (PET), polyurethane (PU), cellulose triacetate (TAC), ultra thin glass (UTG), or the like, but it is not limited thereto.

In an embodiment, the second window 4050 may be produced by, for example, and without limitation, a slimming method of cutting out a thick glass using a chemical process (e.g., etching), a surface noncontact type fusion method of dropping and cooling a glass solution in the air and forming a glass substrate, a roller method of pouring and extruding a glass solution between two rollers, or the like, but it is not limited thereto. For example, the second window 4050 may be produced by widely known various methods that are widely known.

In an embodiment, the second window 4050 may be referred to as an upper window in view of being disposed above the first window 4030. In an embodiment, the second window 4050 may be referred to as a protective window in view of a window that protects the first window 4030 disposed below the second window 4050.

In an embodiment, characteristics of the second window 4050 may be different from those of the first window 4030. For example, the second window 4050 may include UTG, and the first window 4030 may include PI or PET, but they are not limited thereto.

In an embodiment, the second adhesive 4040 may be interposed between the first window 4030 and the second window 4050. For example, the second window 4050 may be adhered above the first window 4030 via the second adhesive 4040.

In an embodiment, the second adhesive 4040 may include, for example, and without limitation, at least one of an optical clear adhesive (OCA), an optical clear resin (OCR), a pressure sensitive adhesive (PSA), or the like.

In an embodiment, a adhesion of the second adhesive 4040 may be lower than that of the first adhesive 4020. For example, a thickness of the second adhesive 4040 applied to the first window 4030 may be thinner than that of the first adhesive 4020 applied to the display panel 4010. For example, instead of replacing the entire display 100 in a case where cracks are caused within the second window 4050 by an external force, to replace the second window 4050 or at least one layer disposed on the second window 4050 (e.g., at least one of a shatterproof coating 4060, a strength reinforcement coating 5060, an anti-fingerprint (AF) coating 6015, an anti-glare (AG) coating 6025, an anti-reflection (AR) coating 6035, and/or a low-refraction (LR) coating 6045, all of which will be described in greater detail below), the adhesion of the second adhesive 4040 may be lower than that of the first adhesive 4020. For example, since the adhesion of the second adhesive 4040 is lower than that of the first adhesive 4020, the second window 4050 or at least one of the layers disposed on the second window 4050 may be separated from the display 100 in a state in which the first window 4030 and the display panel 4010 are adhered. Although not illustrated in FIG. 4A, for the separation from the display 100, the second window 4050 or at least one of the layers disposed on the second window 4050 may overlap a partial region of the first window 4030 when viewed above the first surface. For example, a size of the second window 4050 may be smaller than that of the first window 4030 for the separation from the display 100.

In an embodiment, the shatterproof coating 4060 may be applied to or formed on the first surface of the second window 4050. In an embodiment, the shatterproof coating 4060 may be applied to or formed on at least a part of the side surface of the second window 4050. In an embodiment, the shatterproof coating 4060 may be formed by directly applying a shatterproof solution to the second window 4050. For example, the shatterproof coating 4060 may be applied to a part of the side surface of the second window 4050 and the entire first surface of the second window 4050. For another example, the shatterproof coating 4060 may be applied to the entire side surface of the second window 4050 and the entire first surface of the second window 4050. In an embodiment, the shatterproof coating 4060 may include a material that includes, for example, and without limitation, polysiloxane, an acrylate compound, a photopolymerization initiator, or the like, but it is not limited thereto.

In an embodiment, the shatterproof coating 4060 may include a portion whose adhesion is partly different. For example, referring to FIG. 4A, the shatterproof coating 4060 may include a portion that is in physical contact with the second window 4050 and a portion that is not in physical contact with the second window 4050. The portion of the shatterproof coating 4060 which is not in physical contact with the second window 4050 may reduce or remove an adhesion by, for instance, a method of hardening a surface thereof. For another example, referring to FIGS. 4A and 5A, a protection layer 4070 of FIG. 4A may be replaced with a protection layer 5010 of FIG. 5A, and the shatterproof coating 4060 of the protection layer 5010 may include a portion that is exposed without being in contact with the second window 4050 and the second adhesive 4040. The exposed portion of the shatterproof coating 4060 of the protection layer 5010 may have an adhesion that is removed or is lower than that of the other portion. The adhesion of the shatterproof coating 4060 is partly made different, and thereby foreign materials (e.g., dust) can be prevented and/or reduced from sticking to a portion that does not need adhesion while maintaining junction between the other members.

The display 100 according to an embodiment may not include a shatterproof film (SPF), and may include the shatterproof coating 4060. For example, in a case where the shatterproof film is adhered to the second window 4050 via an adhesive, quality of a surface of the display 100 which is seen outside may be reduced by the adhesive. For example, at least one of dents, bumps, sink marks, waviness, constrictions, or cracks, all of which are caused by the adhesive, may reduce the quality of the surface of the display 100 which is seen outside. The display 100 of the electronic device 10 according to an embodiment includes the shatterproof coating 4060, which is applied to one or more of the first surface of the second window 4050 and at least a part of the side surface of the second window 4050, instead of the shatterproof film (or the strength reinforcement film), and thereby the quality of the surface of the display 100 which is seen outside can be improved. For example, the display 100 of the electronic device 10 according to an embodiment includes the shatterproof coating 4060 that is applied to one or more of the first surface of the second window 4050 and at least a part of the side surface of the second window 4050 without an adhesive, and thereby the quality of the surface of the display 100 which is seen outside can be improved.

For another example, in a case where the shatterproof film is adhered to the second window 4050, the shatterproof film may be deformed by an external force applied to the surface of the display 100 which is seen outside. For example, a pressed or impressed unrecoverable portion may be caused within the shatterproof film by an external force applied to the surface of the display 100 which is seen outside. The pressed or impressed unrecoverable portion may reduce the quality of the surface of the display 100 which is seen outside, or cause erroneous recognition of a touch input. The display 100 of the electronic device according to an embodiment includes the shatterproof coating 4060, which is applied to one or more of the first surface of the second window 4050 and at least a part of the side surface of the second window 4050, instead of the shatterproof film, and thereby the quality of the surface of the display 100 which is seen outside can be improved. For example, the display 100 of the electronic device 10 according to an embodiment includes the shatterproof coating 4060 that is applied to one or more of the first surface of the second window 4050 or at least a part of the side surface of the second window 4050, and thereby the quality of the surface of the display 100 which is seen outside can be improved.

For yet another example, in a case where the shatterproof film is adhered to the second window 4050 having at least one flaw within a part of the side surface, the second window 4050 may be damaged by the at least one flaw when the display 100 is deformed. This is because the shatterproof film is adhered to only the first surface of the second window 4050. The display 100 of the electronic device 10 according to an embodiment includes the shatterproof coating 4060, which is applied to the first surface of the second window 4050 and at least a part of the side surface of the second window 4050, instead of the shatterproof film, and thereby strength of the second window 4050 can be reinforced. For example, since the electronic device 10, which includes the shatterproof coating 4060 applied to the first surface of the second window 4050 and the entire side surface of the second window 4050, may cover the whole of the at least one flaw within a part of the side surface, it can have anti-crack performance that is further reinforced than the electronic device 10 which includes the shatterproof coating 4060 that is applied to the first surface of the second window 4050 or a part of the side surface of the second window 4050.

For yet another example, in a case where the electronic device 10 is a foldable electronic device, the second window 4050 may have a folding axis (e.g., the folding axis A of FIG. 3A). The electronic device 10, which includes the shatterproof coating 4060 applied to a part of the side surface of the second window that is substantially perpendicular to the folding axis (e.g., the folding axis A of FIG. 3A), can have anti-crack performance that is further reinforced than the electronic device 10 which includes the shatterproof coating 4060 that is applied to the remaining part of the side surface of the second window.

For yet another example, in a case where the second window 4050 that is UTG is damaged during use or replacement of the second window 4050, the second window 4050 may be shattered. For example, since getting a cut may be caused by the shattering of the second window 4050, a plan for preventing and/or reducing the shattering of the second window 4050 may be required. The display 100 of the electronic device 10 according to an embodiment includes the shatterproof coating 4060 that is applied to one or more of the first surface of the second window 4050 or at least a part of the side surface of the second window 4050, and thereby the shattering of the second window 4050 can be prevented and/or reduced.

In an embodiment, a thickness of the shatterproof coating 4060 may, for example, be about 15 μm, but it is not limited thereto.

In an embodiment, the second window 4050 and the shatterproof coating 4060 may be referred to as a protection layer 4070 in view of protecting the first window 4030 and the plurality of layers under the first window.

In an embodiment, the protection layer 4070 illustrated in FIG. 4A may be replaced by various structures.

For example, referring to FIG. 4B, the protection layer 4070 may be replaced by a protection layer 4170. In an embodiment, the protection layer 4170 may include the second window 4050 and the shatterproof coating 4060 that is applied to the entire first surface of the second window 4050 or the entire side surface of the second window 4050. For example, a region in which the shatterproof coating 4060 included in the protection layer 4170 surrounds the side surface may be wider than that in which the shatterproof coating 4060 included in the protection layer 4070 surrounds the side surface.

For another example, referring to FIG. 4B, the protection layer 4070 may be replaced by a protection layer 4270. In an embodiment, a shape of the side surface of the second window 4150 included in the protection layer 4270 may be a shape having a curvature. For example, the side surface of the second window 4150 included in the protection layer 4270 may have a curvature. In an embodiment, the shatterproof coating 4060 included in the protection layer 4270 may be applied to at least a part of the side surface of the second window 4150 that is included in the protection layer 4270 and have the curvature, and the first surface of the second window 4150 included in the protection layer 4270. For example, the shatterproof coating 4060 included in the protection layer 4270 may be applied to a part of the side surface of the second window 4150 that is included in the protection layer 4270 and have the curvature, and the entire first surface of the second window 4150 included in the protection layer 4270. For another example, the shatterproof coating 4060 included in the protection layer 4270 may be applied to the entire side surface of the second window 4150 that is included in the protection layer 4270 and have the curvature, and the entire first surface of the second window 4150 included in the protection layer 4270. In an embodiment, the shatterproof coating 4060 may surround the second window 4150. For example, the shatterproof coating 4060 included in the protection layer 4270 may be applied to the entire side surface of the second window 4150 that is included in the protection layer 4270 and have the curvature, the first surface of the second window 4150 included in the protection layer 4270, and the entire second surface of the second window 4150 which is opposite to the first surface.

For yet another example, referring to FIG. 4B, the protection layer 4070 may be replaced by a protection layer 4370. In an embodiment, a shape of the side surface of the second window 4250 included in the protection layer 4370 may be a chamfered shape. In an embodiment, the shatterproof coating 4060 included in the protection layer 4370 may be applied to at least a part of the side surface of the second window 4250 that is included in the protection layer 4370 and have the chamfered shape, and the first surface of the second window 4250 included in the protection layer 4370. For example, the shatterproof coating 4060 included in the protection layer 4370 may be applied to a part of the side surface of the second window 4250 that is included in the protection layer 4370 and have the chamfered shape, and the entire first surface of the second window 4250 included in the protection layer 4370. For another example, the shatterproof coating 4060 included in the protection layer 4370 may be applied to the entire side surface of the second window 4250 that is included in the protection layer 4370 and have the chamfered shape, and the entire first surface of the second window 4150 included in the protection layer 4370. In an embodiment, the shatterproof coating 4060 may surround the second window 4250. For example, the shatterproof coating 4060 included in the protection layer 4370 may be applied to the entire side surface of the second window 4250 that is included in the protection layer 4370 and have the chamfered shape, the first surface of the second window 4250 included in the protection layer 4370, and the entire second surface of the second window 4250 which is opposite to the first surface.

For yet another example, referring to FIG. 4B, the protection layer 4070 may be replaced by a protection layer 4470. In an embodiment, a shape of the side surface of the second window 4350 included in the protection layer 4470 may be a shape in which corners are rounded. For example, each corner of the second window 4350 may be rounded. In an embodiment, the shatterproof coating 4060 included in the protection layer 4470 may be applied to at least a part of the side surface of the second window 4350 which is included in the protection layer 4470 and whose corners are rounded, and the first surface of the second window 4350 included in the protection layer 4470. For example, the shatterproof coating 4060 included in the protection layer 4470 may be applied to a part of the side surface of the second window 4350 which is included in the protection layer 4470 and whose corners are rounded, and the entire first surface of the second window 4350 included in the protection layer 4470. For another example, the shatterproof coating 4060 included in the protection layer 4470 may be applied to the entire side surface of the second window 4350, which is included in the protection layer 4470 and includes the chamfered corners, and to the entire first surface of the second window 4350 included in the protection layer 4470. In an embodiment, the shatterproof coating 4060 may surround the second window 4350. For example, the shatterproof coating 4060 included in the protection layer 4470 may be applied to the entire side surface of the second window 4350 which is included in the protection layer 4470 and whose corners are rounded, the first surface of the second window 4350 included in the protection layer 4470, and the entire second surface of the second window 4350 which is opposite to the first surface.

For yet another example, referring to FIG. 5A, the protection layer 4070 may be replaced by a protection layer 5010. In an embodiment, the shatterproof coating 4060 included in the protection layer 5010 may be applied to at least a part of the side surface of the second window 4050 included in the protection layer 5010, and the second surface of the second window 4050 included in the protection layer 5010. For example, in a case where the display 100 includes the protection layer 5010, the second adhesive 4040 may be interposed between the first window 4030 and a portion of the shatterproof coating 4060 applied to the second surface of the second window 4050 included in the protection layer 5010.

For yet another example, referring to FIG. 5A, the protection layer 4070 may be replaced by a protection layer 5020. In an embodiment, the shatterproof coating 4060 included in the protection layer 5020 may surround the second window 4050 included in the protection layer 5020. For example, the shatterproof coating 4060 included in the protection layer 5020 may be applied to all of the first surface, the side surface, and the second surface of the second window 4050 included in the protection layer 5020. For example, in a case where the display 100 includes the protection layer 5020, the second adhesive 4040 may be interposed between the first window 4030 and a portion of the shatterproof coating 4060 applied to the second surface of the second window 4050 included in the protection layer 5020.

For yet another example, referring to FIG. 5B, the protection layer 4070 may be replaced by a protection layer 5110. In an embodiment, the second window 4050 included in the protection layer 5110 may be interposed between the shatterproof coating 4060 and the strength reinforcement coating 5060. In an embodiment, the strength reinforcement coating 5060 may be disposed to reinforce strength of the second window 4050. In an embodiment, the strength reinforcement coating 5060 may include, for example, and without limitation, an organic inorganic hybrid coating and a silica solution, or the like. In an embodiment, the strength reinforcement coating 5060 may be distinguished from the shatterproof coating 4060 in view of physical properties. In an embodiment, the shatterproof coating 4060 included in the protection layer 5110 may be applied to the first surface of the second window 4050 included in the protection layer 5110, and the strength reinforcement coating 5060 included in the protection layer 5110 may be applied to the side surface and the second surface of the second window 4050 included in the protection layer 5110. For example, the strength reinforcement coating 5060 included in the protection layer 5110 may prevent and/or reduce damage to the second window 4050 by a flaw of the side surface of the second window 4050 included in the protection layer 5110. In an embodiment, in a case where the display 100 includes the protection layer 5110, the second adhesive 4040 may be interposed between the first window 4030 and a portion of the strength reinforcement coating 5060 applied to the second surface of the second window 4050 included in the protection layer 5110.

For yet another example, referring to FIG. 5B, the protection layer 4070 may be replaced by a protection layer 5120. In an embodiment, the second window 4050 included in the protection layer 5120 may be interposed between the shatterproof coating 4060 and the strength reinforcement coating 5060. In an embodiment, the shatterproof coating 4060 included in the protection layer 5120 may be applied to the first surface and the side surface of the second window 4050 included in the protection layer 5120, and the strength reinforcement coating 5060 included in the protection layer 5120 may be applied to the second surface of the second window 4050 included in the protection layer 5120. In an embodiment, in a case where the display 100 includes the protection layer 5120, the second adhesive 4040 may be interposed between the first window 4030 and the strength reinforcement coating 5060 applied to the second surface of the second window 4050 included in the protection layer 5120.

For yet another example, referring to FIG. 5B, the protection layer 4070 may be replaced by a protection layer 5130. In an embodiment, the second window 4050 included in the protection layer 5130 may be interposed between the shatterproof coating 4060 and the strength reinforcement coating 5060. In an embodiment, the shatterproof coating 4060 included in the protection layer 5130 may be applied to the first surface and a part of the side surface of the second window 4050 included in the protection layer 5130, and the strength reinforcement coating 5060 included in the protection layer 5130 may be applied to the second surface and a part of the side surface of the second window 4050 included in the protection layer 5130. In an embodiment, in a case where the display 100 includes the protection layer 5130, the second adhesive 4040 may be interposed between the first window 4030 and a portion of the strength reinforcement coating 5060 applied to the second surface of the second window 4050 included in the protection layer 5130.

For yet another example, referring to FIG. 5B, the protection layer 4070 may be replaced by a protection layer 5140. In an embodiment, the second window 4050 included in the protection layer 5140 may be interposed between the shatterproof coating 4060 and the strength reinforcement coating 5060. In an embodiment, the shatterproof coating 4060 included in the protection layer 5140 may be applied to the second surface and the side surface of the second window 4050 included in the protection layer 5140, and the strength reinforcement coating 5060 included in the protection layer 5140 may be applied to the first surface of the second window 4050 included in the protection layer 5140. In an embodiment, in a case where the display 100 includes the protection layer 5140, the second adhesive 4040 may be interposed between the first window 4030 and a portion of the shatterproof coating 4060 applied to the second surface of the second window 4050 included in the protection layer 5140.

For yet another example, referring to FIG. 5B, the protection layer 4070 may be replaced by a protection layer 5150. In an embodiment, the second window 4050 included in the protection layer 5150 may be interposed between the shatterproof coating 4060 and the strength reinforcement coating 5060. In an embodiment, the shatterproof coating 4060 included in the protection layer 5150 may be applied to the second surface of the second window 4050 included in the protection layer 5150, and the strength reinforcement coating 5060 included in the protection layer 5150 may be applied to the first surface and the side surface of the second window 4050 included in the protection layer 5150. In an embodiment, in a case where the display 100 includes the protection layer 5150, the second adhesive 4040 may be interposed between the first window 4030 and a portion of the shatterproof coating 4060 applied to the second surface of the second window 4050 included in the protection layer 5150.

For yet another example, referring to FIG. 5B, the protection layer 4070 may be replaced by a protection layer 5160. In an embodiment, the second window 4050 included in the protection layer 5160 may be interposed between the shatterproof coating 4060 and the strength reinforcement coating 5060. In an embodiment, the shatterproof coating 4060 included in the protection layer 5160 may be applied to the second surface and a part of the side surface of the second window 4050 included in the protection layer 5160, and the strength reinforcement coating 5060 included in the protection layer 5160 may be applied to the first surface and a part of the side surface of the second window 4050 included in the protection layer 5160. In an embodiment, in a case where the display 100 includes the protection layer 5160, the second adhesive 4040 may be interposed between the first window 4030 and a portion of the shatterproof coating 4060 applied to the second surface of the second window 4050 included in the protection layer 5160.

For yet another example, referring to FIG. 5C, the protection layer 4070 may be replaced by a protection layer 5210. In an embodiment, the strength reinforcement coating 5060 included in the protection layer 5210 may be applied to the second surface and at least a part of the side surface of the second window 4050 included in the protection layer 5210. In an embodiment, in a case where the display 100 includes the protection layer 5210, the second adhesive 4040 included in the protection layer 5210 may be interposed between the first window 4030 and a portion of the strength reinforcement coating 5060 applied to the second surface of the second window 4050 included in the protection layer 5210.

For yet another example, referring to FIG. 5C, the protection layer 4070 may be replaced by a protection layer 5220. In an embodiment, the strength reinforcement coating 5060 included in the protection layer 5220 may be applied to the first surface and at least a part of the side surface of the second window 4050 included in the protection layer 5220. In an embodiment, in a case where the display 100 includes the protection layer 5220, the second adhesive 4040 included in the protection layer 5220 may be interposed between the first window 4030 and the second window 4050 included in the protection layer 5220.

For yet another example, referring to FIG. 5C, the protection layer 4070 may be replaced by a protection layer 5230. In an embodiment, the strength reinforcement coating 5060 included in the protection layer 5230 may surround the second window 4050 included in the protection layer 5230. For example, the strength reinforcement coating 5060 included in the protection layer 5230 may be applied to all of the first surface, the side surface, and the second surface of the second window 4050 included in the protection layer 5230. In an embodiment, in a case where the display 100 includes the protection layer 5230, the second adhesive 4040 included in the protection layer 5230 may be interposed between the first window 4030 and a portion of the strength reinforcement coating 5060 applied to the second surface of the second window 4050 included in the protection layer 5230.

In an embodiment, the strength reinforcement coating 5060 included in the protection layer illustrated in FIGS. 5B and 5C may be replaced, for example, and without limitation, by the shatterproof coating 4060, an anti-fingerprint coating (e.g., 6015 of FIG. 6B), an anti-glare coating (e.g., 6025 of FIG. 6B), an anti-reflection coating (e.g., 6035 of FIG. 6B), a low-refraction coating (e.g., 6045 of FIG. 6B), and/or a combination thereof.

Figure 6A:
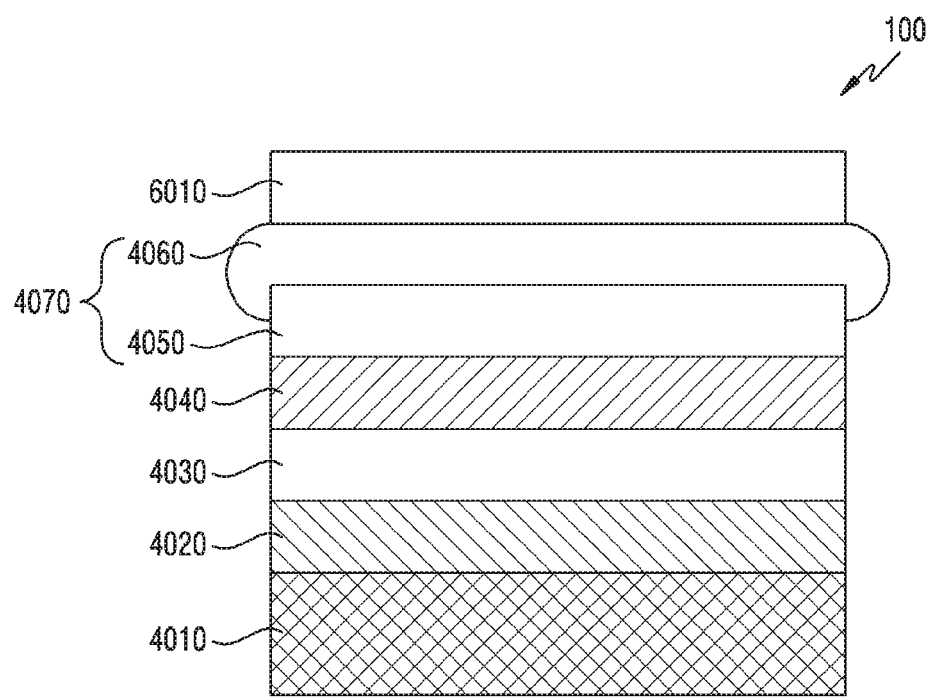
FIG. 6A is a sectional view illustrating an example of the display of the electronic device according to an embodiment.

FIG. 6A is a sectional view illustrating an example of the display 100 of the electronic device according to an embodiment.

Figure 6B:
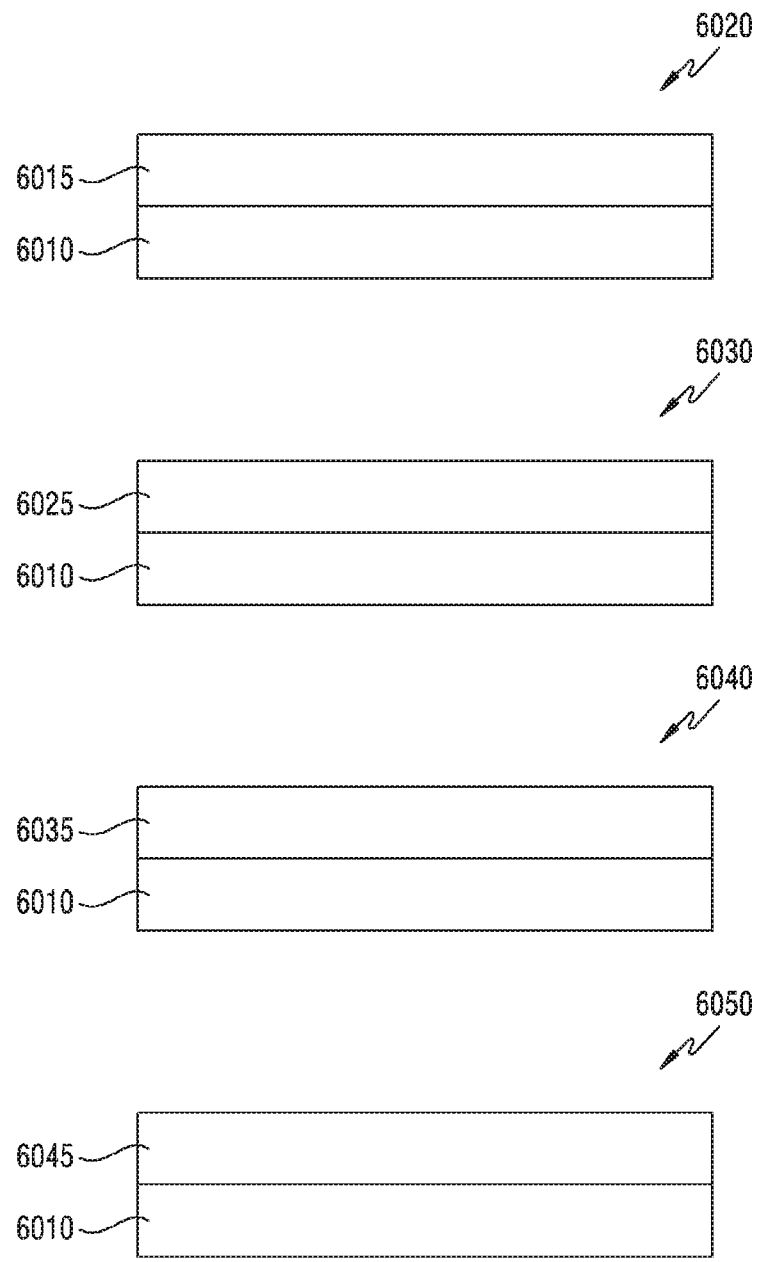
FIG. 6B is a diagram illustrating examples of an outer layer according to an embodiment.

FIG. 6B is a diagram illustrating examples of an outer layer according to an embodiment.

Referring to FIG. 6A, the display 100 may include at least one of a display panel 4010, a first adhesive 4020, a first window 4030, a second adhesive 4040, a second window 4050, a shatterproof coating 4060, and/or a hard coating 6010.

In an embodiment, the display panel 4010, the first adhesive 4020, the first window 4030, the second adhesive 4040, the second window 4050, and the shatterproof coating 4060 illustrated in FIG. 6A may correspond to the display panel 4010, the first adhesive 4020, the first window 4030, the second adhesive 4040, the second window 4050, and the shatterproof coating 4060 illustrated in FIG. 4A, respectively.

In an embodiment, the protection layer 4070 of FIG. 6A may be replaced by any of the protection layers illustrated in FIGS. 4B, 5A, 5B and 5C.

In an embodiment, the hard coating 6010 may be disposed on the shatterproof coating 4060. In an embodiment, the hard coating 6010 may be disposed on the shatterproof coating 4060 to reinforce hardness of the surface of the display 100 which is seen outside. In an embodiment, the hard coating 6010 may include, for example, and without limitation, an organic coating material using melamine, acryl, and/or urethane, inorganic coating material using silicon-based materials, and hybrid coating material combining organic-based materials and inorganic-based materials. In an embodiment, the hard coating 6010 may be replaced by an outer layer having at least one coating.

For example, referring to FIG. 6B, the hard coating 6010 may be replaced by an outer layer 6020. In an embodiment, the outer layer 6020 may include the hard coating 6010 applied to the protection layer 4070, and an anti-fingerprint coating 6015 applied to the hard coating 6010. For example, the anti-fingerprint coating 6015 prevents and/or reduces fingerprints of fingers touched on the surface of the display 100 which is seen outside from remaining on surface of the display 100 which is seen outside, and thereby can improve visibility.

For another example, referring to FIG. 6B, the hard coating 6010 may be replaced by an outer layer 6030. In an embodiment, the outer layer 6030 may include the hard coating 6010 applied to the protection layer 4070, and an anti-glare coating 6025 applied to the hard coating 6010. For example, the anti-glare coating 6025 increases a haze, and thereby can prevent and/or reduce glare and improve visibility of a deformed portion of the display 100.

For another example, referring to FIG. 6B, the hard coating 6010 may be replaced by an outer layer 6040. In an embodiment, the outer layer 6040 may include the hard coating 6010 applied to the protection layer 4070, and an anti-reflection coating 6035 applied to the hard coating 6010. For example, the anti-reflection coating 6035 may be applied to the hard coating 6010 to prevent and/or reduce the display 100 from reflecting light thrown from the outside. For example, the anti-reflection coating 6035 enables destructive interference to occur between light thrown from the outside and reflected light of the light. For example, due to the destructive interference, the anti-reflection coating 6035 may improve visibility of the display 100 outside, and visibility of a deformed portion of the display 100.

For another example, referring to FIG. 6B, the hard coating 6010 may be replaced by an outer layer 6050. In an embodiment, the outer layer 6050 may include the hard coating 6010 applied to the protection layer 4070, and a low-refraction coating 6045 applied to the hard coating 6010. For example, the low-refraction coating 6045 may be applied to the hard coating 6010 in order for the display 100 to control refraction of light thrown from the outside. For example, due to the control of the refraction of light, the low-refraction coating 6045 may improve visibility of the display 100 outside, and visibility of a deformed portion of the display 100.

FIG. 6B illustrates examples in which the anti-fingerprint coating 6015, the anti-glare coating 6025, the anti-reflection coating 6035, or the low-refraction coating 6045 is disposed on the hard coating 6010, but various design changes that are not illustrated in FIG. 6B are possible. For example, the hard coating 6010, the anti-fingerprint coating 6015, the anti-glare coating 6025, the anti-reflection coating 6035, the low-refraction coating 6045, or a combination thereof may be applied to the shatterproof coating 4060.

Figure 7A:
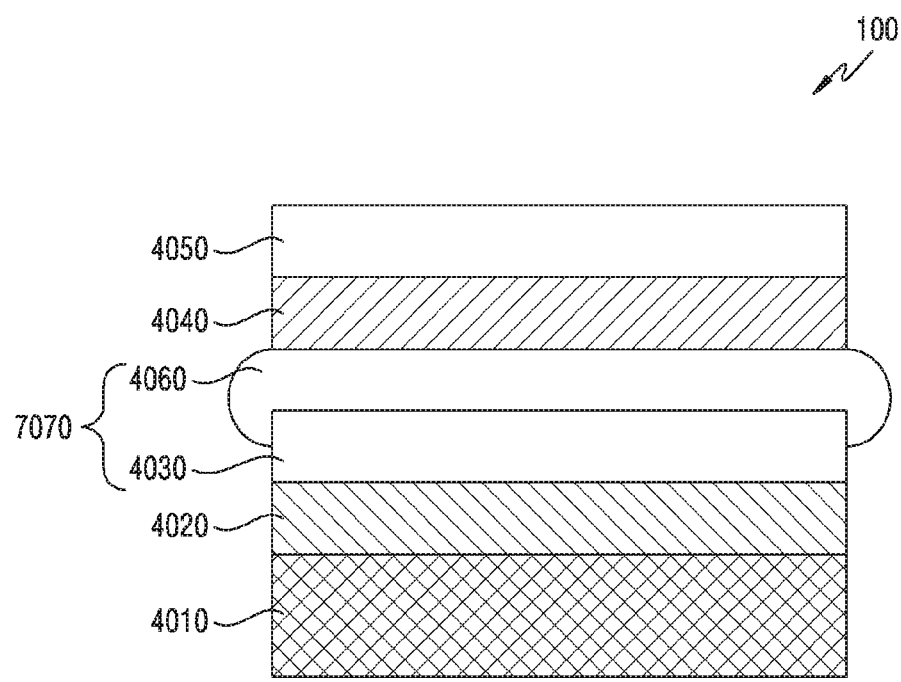
FIG. 7A is a sectional view illustrating an example of the display of the electronic device according to an embodiment.

FIG. 7A is a sectional view illustrating an example of the display 100 of the electronic device according to an embodiment.

Referring to FIG. 7A, the display 100 of the electronic device 10 (e.g., an electronic device 1001) according to an embodiment may include at least one of a display panel 4010, a first adhesive 4020, a first window 4030, a second adhesive 4040, a second window 4050, and/or a shatterproof coating 4060.

In an embodiment, the display panel 4010, the first adhesive 4020, the first window 4030, the second adhesive 4040, the second window 4050, and the shatterproof coating 4060 illustrated in FIG. 7A may correspond to the display panel 4010, the first adhesive 4020, the first window 4030, the second adhesive 4040, the second window 4050, and the shatterproof coating 4060 illustrated in FIG. 4A, respectively.

In an embodiment, the first window 4030 may include a plurality of layers. For example, the first window 4030 may include at least one layer including UTG or a polymer material (e.g., PET and/or PI). For example, the first window 4030 may further include a coating layer on a first surface of the first window 4030 or at least a part of a second surface opposite to the first surface. For another example, in the case where the first window 4030 is includes the plurality of layers, at least one coating layer may be further included between the plurality of layers of the first window 4030.

In an embodiment, the first window 4030 may include a first surface, a second surface opposite to the first surface, and a side surface disposed between the first surface and the second surface.

In an embodiment, unlike the display 100 illustrated in FIG. 4A, the shatterproof coating 4060 illustrated in FIG. 7A may be applied to or formed on the first surface of the first window 4030. In an embodiment, the shatterproof coating 4060 may be applied to or formed on at least a part of the side surface of the first window 4030. For example, the shatterproof coating 4060 may be applied to a part of the side surface of the first window 4030, and the entire first surface of the first window 4030. For another example, the shatterproof coating 4060 may be applied to the entire side surface of the first window 4030, and the entire first surface of the first window 4030.

In an embodiment, the first window 4030 and the shatterproof coating 4060 may be referred to as a middle layer or an intermediate layer 7070 in view of being disposed between the display panel 4010 and the second window 4050.

In an embodiment, the intermediate layer 7070 may be replaced by various structures. For example, the intermediate layer 7070 may be replaced by an intermediate layer in which the second window 4050 of the protection layer 4170 illustrated in FIG. 4B is replaced by the first window 4030, an intermediate layer in which the second window 4050 of the protection layer 4270 illustrated in FIG. 4B is replaced by the first window 4030 having the shape of the side surface of the second window 4050 of the protection layer 4270 illustrated in FIG. 4B, an intermediate layer in which the second window 4050 of the protection layer 4370 illustrated in FIG. 4B is replaced by the first window 4030 having the shape of the side surface of the second window 4050 of the protection layer 4370 illustrated in FIG. 4B, an intermediate layer in which the second window 4050 of each of the protection layers 5010 to 5020 illustrated in FIG. 5A is replaced by the first window 4030, an intermediate layer in which the second window 4050 of each of the protection layers 5110 to 5160 illustrated in FIG. 5B is replaced by the first window 4030, or an intermediate layer in which the second window 4050 of each of the protection layers 5210 to 5230 illustrated in FIG. 5C is replaced by the first window 4030.

Figure 7B:
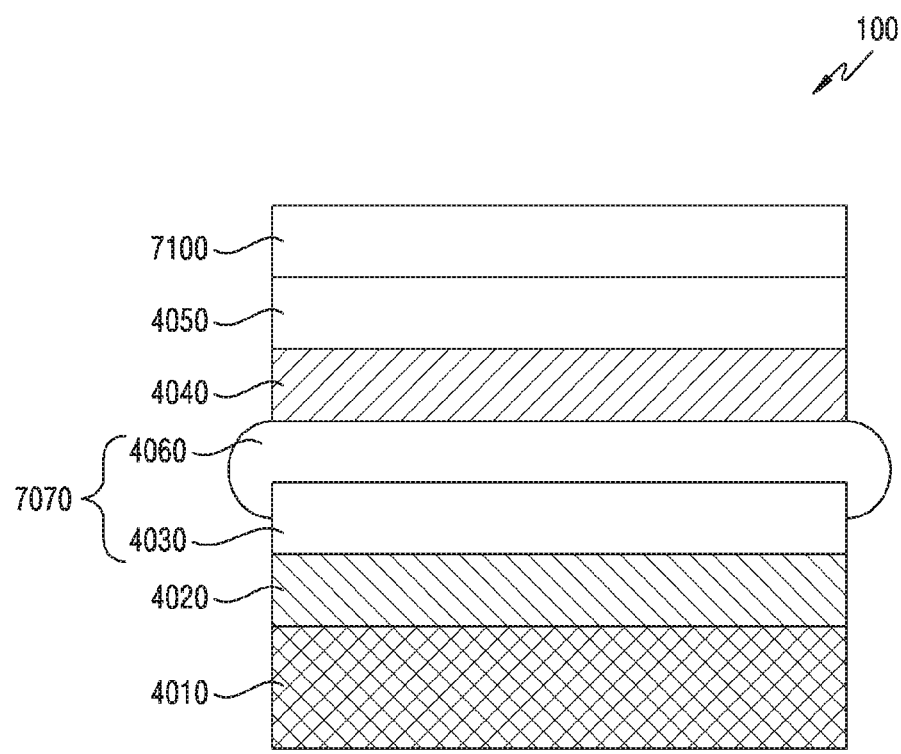
FIG. 7B is a sectional view illustrating an example of the display of the electronic device according to an embodiment.

FIG. 7B is a sectional view illustrating an example of the display 100 of the electronic device according to an embodiment.

Referring to FIG. 7B, the display 100 may include at least one of a display panel 4010, a first adhesive 4020, a first window 4030, a second adhesive 4040, a second window 4050, a shatterproof coating 4060, and/or a hard coating 7100.

In an embodiment, the display panel 4010, the first adhesive 4020, the first window 4030, the second adhesive 4040, the second window 4050, the shatterproof coating 4060, and the hard coating 7100 illustrated in FIG. 7B may correspond to the display panel 4010, the first adhesive 4020, the first window 4030, the second adhesive 4040, the second window 4050, the shatterproof coating 4060, and the hard coating 6010 illustrated in FIG. 6A, respectively.

In an embodiment, the hard coating 7100 may be replaced by an outer layer having at least one coating. For example, the hard coating 7100 may be replaced by one of the outer layers illustrated in FIG. 6B.

As described above, the electronic device (e.g., the electronic device 10) according to an example embodiment may include a deformable display panel (e.g., the display panel 4010), a first window (e.g., the first window 4030) disposed on the deformable display panel, a first adhesive (e.g., the first adhesive 4020) disposed between the deformable display panel and the first window, a second window (e.g., the second window 4050) disposed on the first window and includes a first surface, a second surface opposite the first surface, and a side surface disposed between the first surface and the second surface, a second adhesive (e.g., the second adhesive 4040) disposed between the first window and the second window, and a shatterproof coating (SPC) (e.g., the shatterproof coating 4060) provided on at least a part of the side surface and the first surface.

In an example embodiment, the shatterproof coating may be provided on the entire side surface and the entire first surface.

In an example embodiment, the shatterproof coating may be provided on a part of the side surface and the entire first surface.

In an example embodiment, a shape of the side surface may be a shape having a curvature.

In an example embodiment, a shape of the side surface may be a chamfered shape.

In an example embodiment, the shatterproof coating may be provided on surround the first surface, the second surface, and the side surface, and the second adhesive may be disposed between the first window and a portion of the shatterproof coating that surrounds the second surface.

In an example embodiment, the electronic device may further include a strength reinforcement coating (e.g., the strength reinforcement coating 5060) provided on a part of the side surface and the second surface, and the shatterproof coating may be provided the remaining part of the side surface and the first surface.

In an example embodiment, the second adhesive may be disposed between the first window and a portion of the strength reinforcement coating provided on the second surface.

In an example embodiment, the first window may include polyimide (PI), polyethylene terephthalate (PET), polyurethane (PU), or cellulose triacetate (TAC), and the second window may include UTG.

In an example embodiment, an adhesion of the first adhesive may be greater than an adhesion of the second adhesive.

In an example embodiment, the shatterproof coating may be directly provided on at least a part of the side surface and the first surface without an adhesive.

In an example embodiment, the deformable display panel may be deformed based on folding of the electronic device, and the shatterproof coating may be provided on the first surface and a portion of the side surface that is substantially perpendicular to an axis of the folding.

As described above, the electronic device according to an example embodiment may include a deformable display panel, a first window disposed on the deformable display panel and including a first surface, a second surface opposite the first surface, and a side surface disposed between the first surface and the second surface, a first adhesive disposed between the deformable display panel and the first window, a shatterproof coating (SPC) provided on at least a part of the side surface and the first surface, a second window disposed on the first window, and a second adhesive disposed between the first window and the second window.

In an example embodiment, the shatterproof coating may be provided on the entire side surface and the entire first surface.

In an example embodiment, the shatterproof coating may be provided on a part of the side surface and the entire first surface.

In an example embodiment, the second adhesive may be disposed between the second window and a portion of the shatterproof coating provided on the first surface.

In an example embodiment, the electronic device may further include a hard coating provided on the second window.

In an example embodiment, the electronic device may further include an anti-fingerprint (AF) coating provided on the hard coating, an anti-glare (AG) coating provided on the hard coating, an anti-reflection (AR) coating provided on the hard coating, or a low-refraction (LR) coating provided on the hard coating.

In an example embodiment, the shatterproof coating may comprise a material including polysiloxane, an acrylate compound, and a photopolymerization initiator.

In an example embodiment, the electronic device may further include a strength reinforcement coating provided on a part of the side surface and the second surface, and the shatterproof coating may be provided on the remaining part of the side surface and the first surface.

In an example embodiment, the first adhesive may be disposed between the first window and a portion of the strength reinforcement coating provided on the second surface.

In an example embodiment, the first window may include ultra thin glass (UTG), and the second window may include polyimide (PI) or polyethylene terephthalate (PET).

In an example embodiment, the shatterproof coating may be directly provided on at least a part of the side surface and the first surface without an adhesive.

In an example embodiment, the deformable display panel may be deformed based on folding of the electronic device, and the shatterproof coating may be provided on the first surface and a portion of the side surface that is substantially perpendicular to an axis of the folding.

Figure 8:
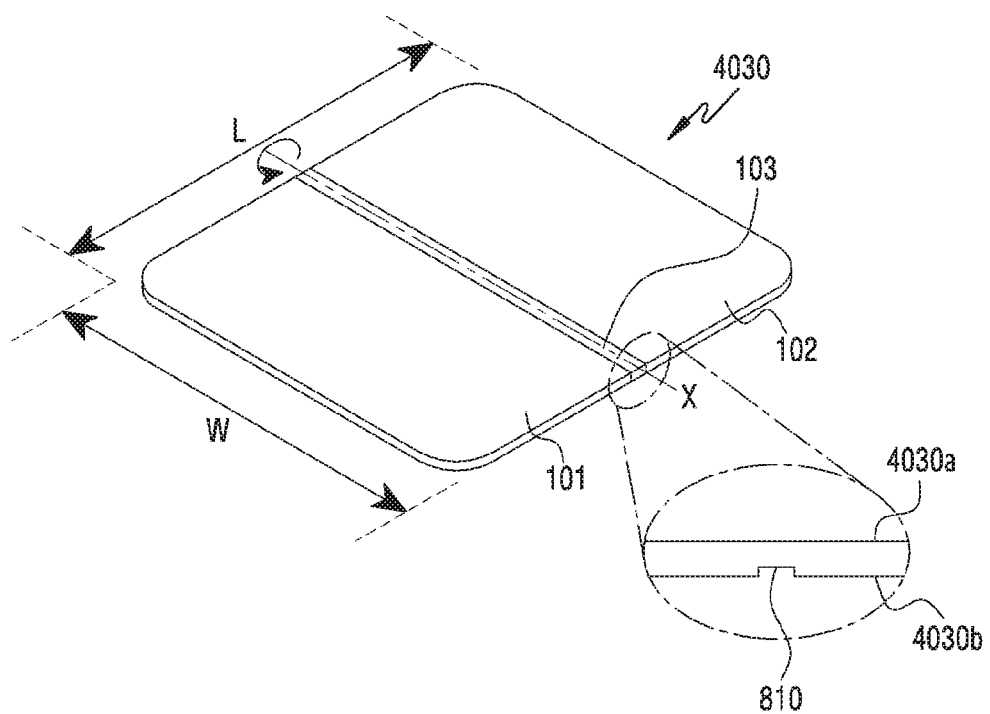
FIG. 8 is a diagram illustrating an example first window of the display according to an embodiment.

FIG. 8 is a perspective view illustrating an example first window 4030 of the display 100 according to an embodiment.

Referring to FIG. 8, the first window 4030 may include a first region 101, a second region 102, and a folding region 103. The description given with reference to FIGS. 3A, 3B and 3C may be equally applied to those of the first region 101, the second region 102, and the folding region 103.

In an embodiment, the first window 4030 may include a groove (or a recess) 810. The groove 810 may be formed in at least a part of the folding region 103 of the first window 4030. For example, the groove 810 may be formed in a portion of the folding region 103 of the first window 4030. For another example, the groove 810 may be formed in an entire portion of the folding region 103 of the first window 4030. For another example, the groove 810 may be formed in an entire portion of the folding region 103, a portion of the first region 101, and a portion of the second region 102 of the first window 4030. The groove 810 may be formed over the fording region 103 or may be formed only in the folding region 103. For example, when the groove 810 is formed only in the folding region 103, the width of the folding region 103 corresponding to a length direction L may have a first length, and the groove 810 may have a second length that is less than or equal to the first length. For other example, when the groove 810 is formed over the folding region 103, the folding region 103 may have the first length, and the groove 810 may have a third length greater than the first length. The third length may be about twice the first length, but is not limited thereto. According to an embodiment, stress that may be concentrated in the folding region 103 according to folding of the electronic device 10 may be distributed by forming the recess 810. As the width of the groove 810 increases, the effect of the dispersing the stress may increase.

When the groove 810 is formed, since the folding region 103 may have different thicknesses from the first region 101 and the second region 102, the folding region 103 of the first window 4030 or a boundary of the folding region 103 may be visible to the user. In an embodiment, the groove 810 may extend inward with a designated inclination range from outer edge thereof, and may have a designated depth. In an embodiment, as the width of the groove 810 increases, a portion of the groove 810 extending to the designated depth may extend more gently (or gradual). In an embodiment, as the portion of the groove 810 extending to the designated depth extends gently, the degree to which the folding area 103 of the first window 4030 is visible may be reduced or invisible. The groove 810 may extend in a width direction w of the first window 4030 in the folding region 103.

In an embodiment, a portion in which the groove 810 is formed in the first window 4030 may be thinner than the other portion in which the groove 810 is not formed in the first window 4030.

In an embodiment, the folding region 103 of the first window 4030 may be bent or curved depending on a folding operation of the electronic device 10. For example, the first window 4030 may be deformed on the basis of a folding axis X of the folding region 103 depending on the folding operation of the electronic device 10. The folding region 103 of the first window 4030 is formed to be thinner than the other portion, and thereby the first window 4030 can secure flexibility required depending on the folding operation of the electronic device 10.

In an embodiment, in a case where the first window 4030 includes a synthetic resin film, the first window 4030 including the groove 810 may, for example, and without limitation, be produced by stamping the groove 810 while producing a synthetic resin film, for instance, using processes such as roller pressing, film extrusion, stamping, cell casting, and so on.

In an embodiment, in a case where the first window 4030 includes UTG, the first window 4030 including the groove 810 may, for example, and without limitation, be produced by pressing flat panel-shaped tempered glass with a roller having a protrusion, or using processes such as etching, polishing, lathe machining, laser machining, and so on.

In an embodiment, the first window 4030 may, for example, and without limitation, be produced by a cell casting process of molding flat panel-shaped tempered glass and forming the groove 810.

In an embodiment, a shape of the groove 810, a position at which the groove 810 is formed in the folding region 103, etc. are not limited to the illustrated example. For example, the groove 810 may be formed in not a second surface 4030b of the first window 4030 but a first surface 4030a of the first window 4030, or both the first surface 4030a and the second surface 4030b. For another example, the groove 810 may be formed to have a step as illustrated, or have a curved surface other than the illustrated step. In this case, the curved surface may be formed such that a thickness of the first window 4030 increases from the center to an end of the first window 4030 in a length direction L of the first window 4030. Other examples of the groove 810 will be described with reference to FIG. 10.

Figure 9:
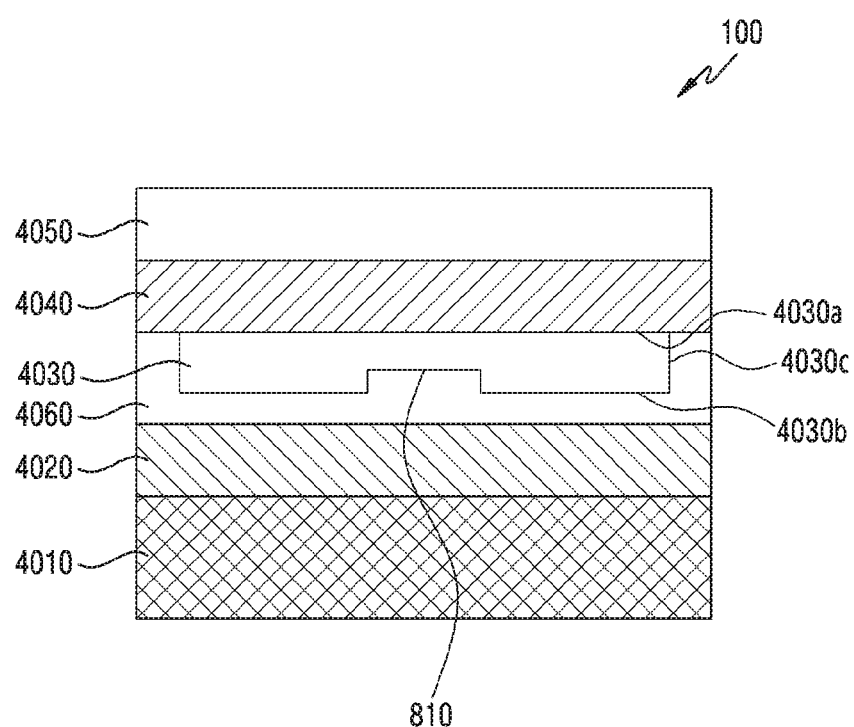
FIG. 9 is a sectional view illustrating an example of the display according to an embodiment.

FIG. 9 is a sectional view illustrating an example of the display 100 according to an embodiment.

Referring to FIG. 9, the display 100 of the electronic device 10 (e.g., an electronic device 1001) according to an embodiment may include at least two of a display panel 4010, a first adhesive 4020, a first window 4030, a second adhesive 4040, a second window 4050, and/or a shatterproof coating 4060.

The display panel 4010, the first adhesive 4020, the first window 4030, the second adhesive 4040, the second window 4050, and the shatterproof coating 4060 illustrated in FIG. 9 may correspond to the display panel 4010, the first adhesive 4020, the first window 4030, the second adhesive 4040, the second window 4050, and the shatterproof coating 4060 illustrated in FIG. 7A, respectively.

In an embodiment, the first window 4030 may include a groove 810 unlike the first window 4030 illustrated in FIG. 7A.

In an embodiment, the shatterproof coating 4060 may be applied to or disposed on a surface in which the groove 810 of the first window 4030 is formed. For example, the shatterproof coating 4060 may be applied to a second surface 4030b of the first window 4030 in which the groove 810 is formed.

In an embodiment, the shatterproof coating 4060 may have optical properties that are identical or similar to those of the first window 4030. In an embodiment, since the first window 4030 includes the groove 810, a part of which has a different thickness, a deflection in quality of an image penetrated through the first window 4030 may occur on a screen of the display 100. For example, a difference between brightness of a portion in which the groove 810 is formed and brightness of the other portion may occur. In an embodiment, the shatterproof coating 4060 may include a material whose optical properties are substantially identical or similar to the optical properties (e.g., a refractive index) of the first window 4030, the deflection in quality of the image that may occur due to a difference in thickness of the first window 4030 can be reduced.

In an embodiment, the shatterproof coating 4060 may be applied to or formed on at least a part of a side surface 4030c of the first window 4030. In an embodiment, the side surface 4030c of the first window 4030 may include at least one flaw, and a region including the at least one flaw may be subjected to easier occurrence of cracks or damage than the other region due to an external shock. In an embodiment, the shatterproof coating 4060 is applied to at least a part of the side surface 4030c of the first window 4030 that is vulnerable to the external shock, and thereby resistance to a shock of the first window 4030 can be improved. In an embodiment, the shatterproof coating 4060 applied to the first window 4030 may prevent and/or reduce shattering of fine pieces that may occur in a case where the first window 4030 is damaged.

In an embodiment, a resin layer (e.g., PET) for absorbing an external shock applied to the display panel 4010 may be interposed between the first adhesive 4020 and the display panel 4010. The resin layer may be substantially transparently formed. In the case where the resin layer is interposed, the display 100 according to an embodiment may further include an adhesive layer for adhering the resin layer to the display panel 4010.

Although not illustrated, the display 100 according to an embodiment may include a hard coating (e.g., the hard coating 6010 of FIG. 6A) disposed above the first window 4030. In an embodiment, the hard coating may be replaced by an outer layer including at least one coating. For example, the hard coating may be replaced by one of the outer layers illustrated in FIG. 6B. For another example, the hard coating may be replaced by a plurality of layers that include at least two of the hard coating (e.g., 6010 of FIG. 6A), the anti-fingerprint coating (e.g., 6015 of FIG. 6B), the anti-glare coating (e.g., 6025 of FIG. 6B), the anti-reflection coating (e.g., 6035 of FIG. 6B), and the low-refraction coating (e.g., 6045 of FIG. 6B).

In another embodiment, a shape of the side surface 4030c of the first window 4030 is not limited to the example illustrated in FIG. 9. For example, the shape of the side surface 4030c of the first window 4030 may have a curvature like the shape of the side surface of the second window 4150 illustrated in FIG. 4B. For another example, the shape of the side surface 4030c of the first window 4030 may be a chamfered shape like the second window 4250 illustrated in FIG. 4B. For yet another example, the shape of the side surface 4030c of the first window 4030 may a shape that includes rounded corners like the shape of the side surface of the second window 4350 illustrated in FIG. 4B.

In another embodiment, the groove 810 may be formed in the second window 4050 but not the first window 4030. In this case, the shatterproof coating 4060 may be applied to a surface in which the groove 810 of the second window 4050 is formed, or at least a part of the side surface of the second window 4050 rather than the first window 4030.

In an embodiment, the first window 4030 may be disposed such that at least a part of the side surface 4030c of the first window 4030 is located inside a periphery of at least one of the display panel 4010, the first adhesive 4020, the second adhesive 4040, the shatterproof coating 4060, and/or the second window 4050. The at least one of the display panel 4010, the first adhesive 4020, the second adhesive 4040, the shatterproof coating 4060, and/or the second window 4050 may protrude outside the side surface 4030c of the first window 4030. The first window 4030 is disposed inside the other elements of the display 100, and thereby a shock that may be applied to the first window 4030 can be reduced.

Figure 10:
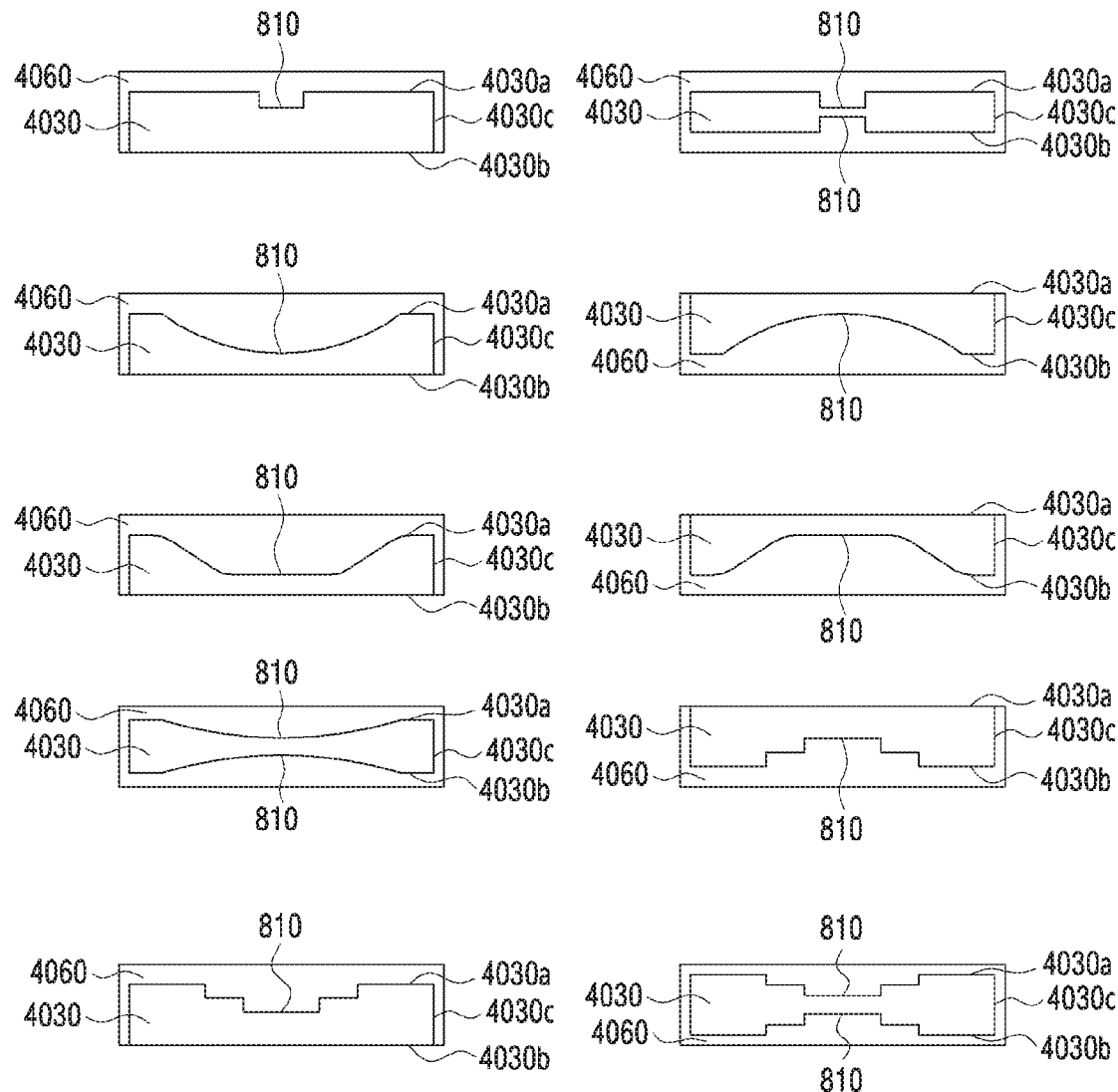
FIG. 10 is a diagram illustrating examples of a first window and a shatterproof coating according to an embodiment.

FIG. 10 is a diagram illustrating examples of the first window 4030 and the shatterproof coating 4060 according to an embodiment.

Referring to FIG. 10, the groove 810 of the first window 4030 may be formed at various positions. For example, the groove 810 may be formed in the first surface 4030a and/or the second surface 4030b of the first window 4030.

In an embodiment, the groove 810 of the first window 4030 may include at least one step and/or curved surface.

In an embodiment, the groove 810 of the first window 4030 may include at least one step and/or at least one curved surface. When the groove 810 includes a plurality of the curved surfaces, the curvature ranges of the plurality of curved surfaces may be different each other. For example, the groove 810 may include a first flat surface formed in the center thereof, a first curved surface extending from the first flat surface outwardly of the groove 810, and a second curved surface extending from the first curved surface to an outer edge of the groove 810. The first curved surface may have a greater degree of bending than the second curved surface, but is not limited thereto. Conversely, the second curved portion may have a greater degree of bending than the first curved surface. The direction in which the first curved surface is bent may be different from the direction in which the second curved surface is bent, but is not limited thereto. For other example, the groove 810 may include the first flat surface formed in the center thereof, a first curved surface extending from the first flat surface outwardly of the groove 810, a second flat surface extending from the first curved surface outwardly of the groove 810, and a second curved surface extending from the second flat surface to an outer edge of the groove 810. The second flat surface may have a different inclination from the first flat surface. The degree of bending of the second curved surface may be different from that of the first curved surface. The first flat surface may correspond to the folding axis of the first window 4030. When the groove 810 is formed over the folding region 103, the second flat surface may correspond to or overlap an edge of the folding region 103, but is not limited thereto. For example, the edge of the folding region 103 may correspond to or overlap the first flat surface.

In an embodiment, the shatterproof coating 4060 may be applied to the surfaces (e.g., the first surface 4030*a* and/or the second surface 4030*b*) of the first window 4030 in which the groove 810 is formed.

In an embodiment, the shatterproof coating 4060 may be applied to at least a part of the side surface 4030*c* of the first window 4030.

The shape of the groove 810 of the first window 4030 is not limited to the illustrated example, and various shapes or structures in which a portion of the first window 4030 in which the groove 810 is formed is formed to be thinner than the other portion may be applied. For example, the shape of the groove 810 may include a square, a rectangle, oval, or trapezoid, but is not limited thereto. For another example, the shape of the groove 810 may include a rectangle with rounded corners, and a trapezoid with rounded corners.

The description of FIG. 10 is made based on the first window 4030. However, since the groove 810 may be formed in the second window 4050 but not in the first window 4030, this may be equally or correspondingly applied to the second window 4050. For example, the groove 810 may be formed in the first surface and/or the second surface of the second window 4050, and the groove 810 formed in the first surface and/or the second surface may include a curved surface and/or a step. The shatterproof coating 4060 may be applied to the surfaces (e.g., the first surface and/or the second surface) of the second window 4050 in which the groove 810 is formed, rather than the first window 4030.

Figure 11A:
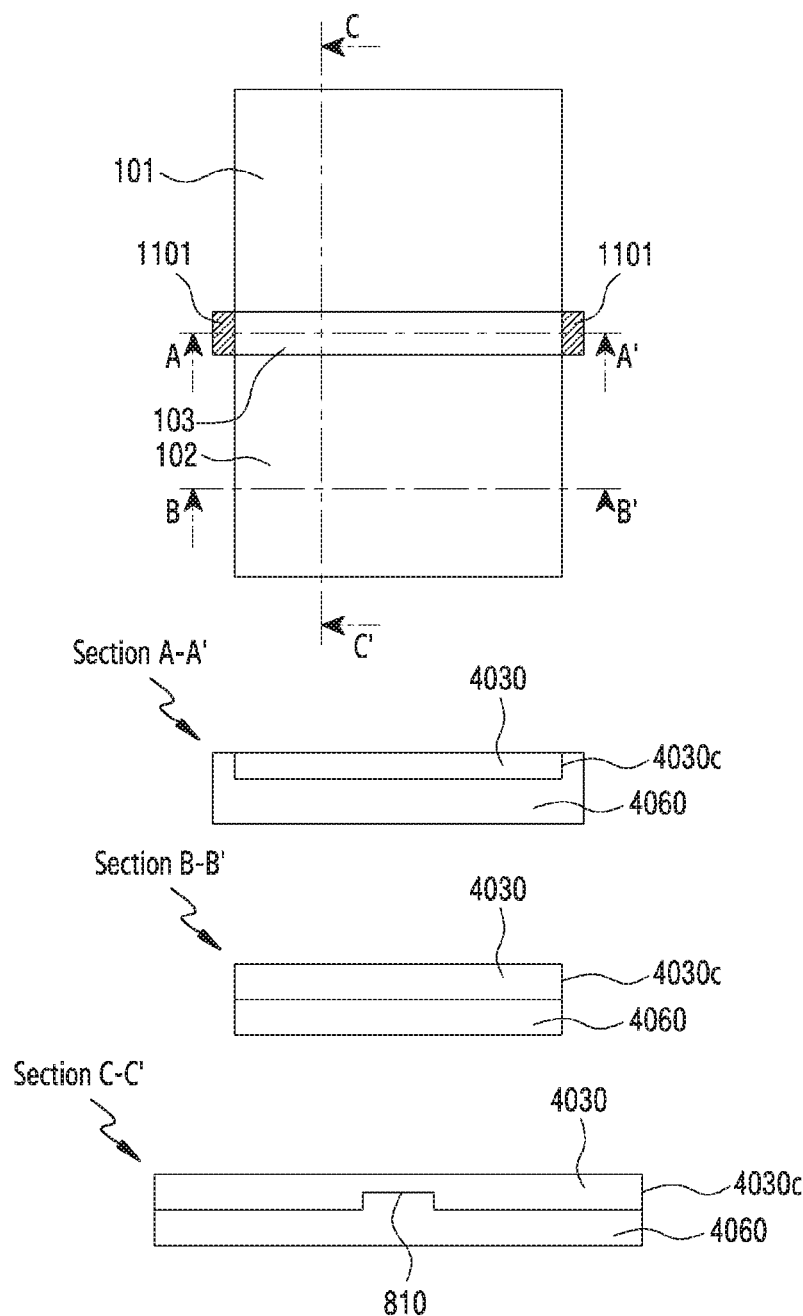
FIG. 11A is a diagram illustrating an example first window and shatterproof coating according to an embodiment.

FIG. 11A is a diagram illustrating an example first window 4030 and the shatterproof coating 4060 according to an embodiment.

Figure 11B:
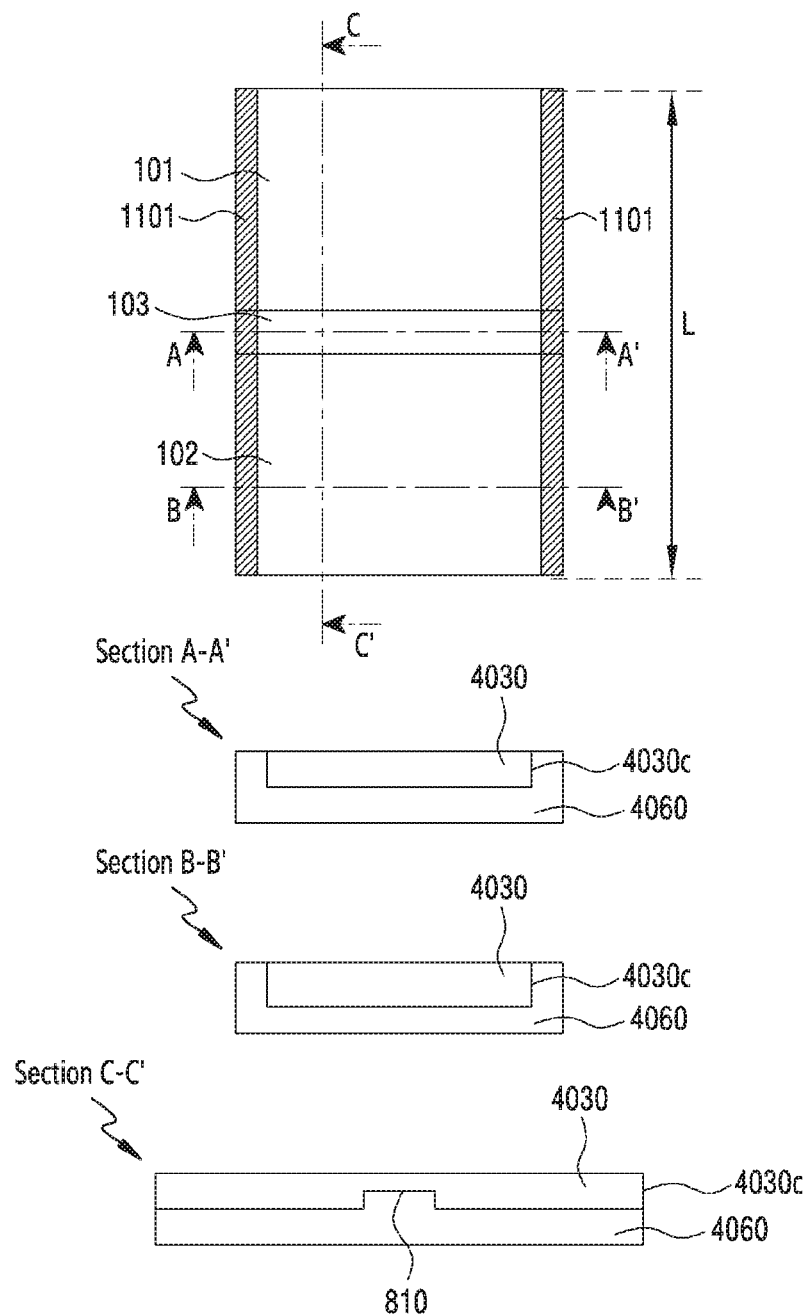
FIG. 11B is a diagram illustrating an example first window and shatterproof coating according to an embodiment.

FIG. 11B is a diagram illustrating an example first window 4030 and the shatterproof coating 4060 according to an embodiment.

Figure 11C:
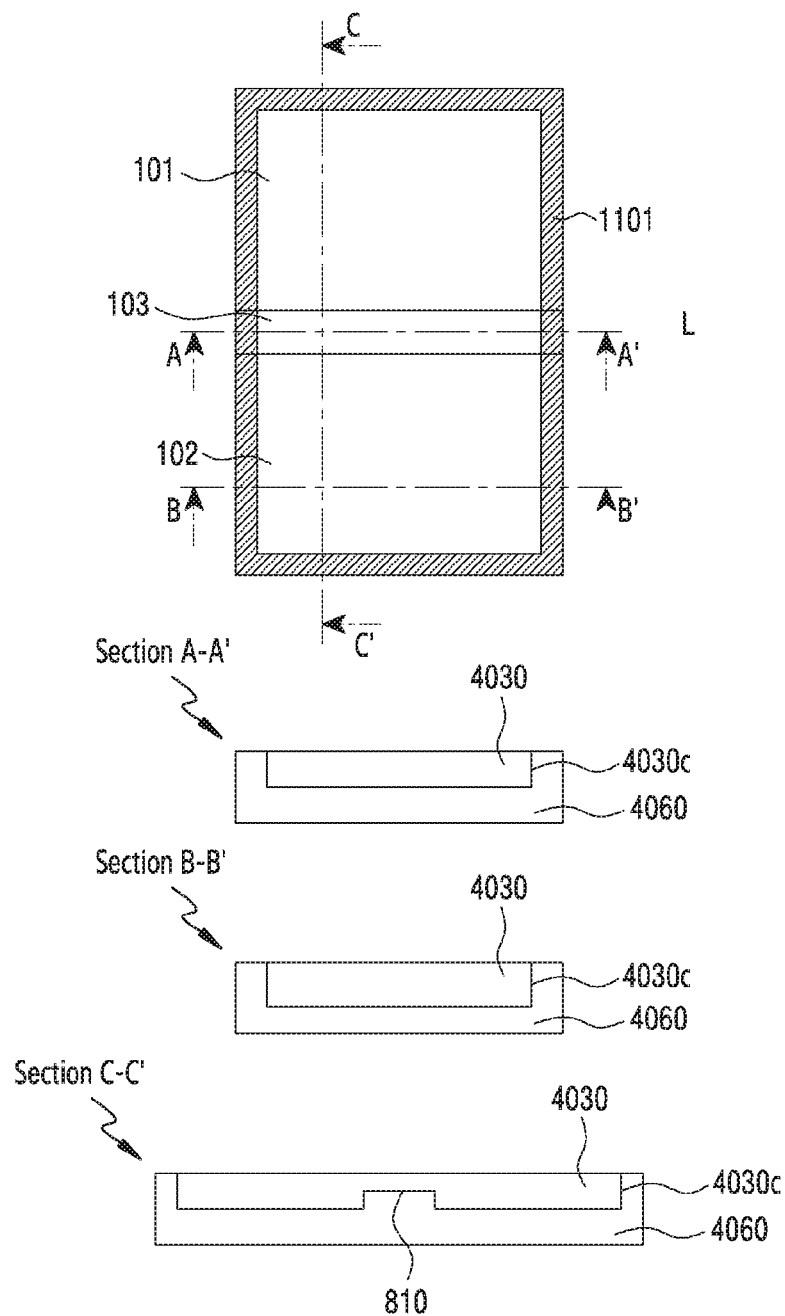
FIG. 11C is a diagram illustrating an example first window and shatterproof coating 4060 according to an embodiment.

FIG. 11C is a diagram illustrating an example first window 4030 and the shatterproof coating 4060 according to an embodiment.

In an embodiment, the shatterproof coating 4060 may be applied to at least side surfaces of the folding region 103 within the side surface 4030*c* of the first window 4030. Side surface application regions 1101 indicate regions to which the shatterproof coating 4060 is applied within the side surface 4030*c* of the first window 4030.

For example, referring to FIG. 11A, the shatterproof coating 4060 may be applied to side surfaces corresponding to the folding region 103 within the side surface 4030*c* of the first window 4030.

For another example, referring to FIG. 11B, the shatterproof coating 4060 may be applied to side surfaces corresponding to the folding region 103 within the side surface 4030*c* of the first window 4030, and side surfaces that extend from the side surfaces in a length direction L. In an embodiment, the side surfaces extending in the length direction L may be side surfaces that are substantially perpendicular to a folding axis (e.g., the folding axis X of FIG. 8) of the first window 4030 within the side surface 4030*c* of the first window 4030.

For another example, referring to FIG. 11C, the shatterproof coating 4060 may be applied to the entire side surface 4030*c* of the first window 4030.

The description of FIGS. 11A, 11B, and 11C is made on the basis of the first window 4030. However, since the groove 810 may be formed in the second window 4050 but not in the first window 4030, this may be equally or correspondingly applied to the second window 4050 in which the groove 810 is formed. For example, the groove 810 may be formed in the second window 4050 but not in the first window 4030, and the shatterproof coating 4060 may be applied to a surface of the second window 4050 in which the groove 810 is formed and at least a part of the side surface of the second window 4050. For example, the shatterproof coating 4060 may surround a side surface region corresponding to the folding region to correspond to the illustration of FIG. 11A within the side surface of the second window 4050. For another example, the shatterproof coating 4060 may surround the entire side surface of the second window 4050 to correspond to the illustration of FIG. 11C.

The description of FIGS. 11A, 11B, and 11C is made based on the first window 4030 in which the groove 810 is formed. However, as illustrated in FIG. 7A, this may be equally or correspondingly applied to the first window 4030 that does not include the groove 810. For example, the shatterproof coating 4060 of FIG. 7A may be applied to at least a part of the side surface of the first window 4030.

The description of FIGS. 11A, 11B, and 11C is made based on the shatterproof coating 4060 applied to the first window 4030. However, as illustrated in FIG. 4A, this may be equally or correspondingly applied to a case where the shatterproof coating 4060 is applied to the second window 4050. For example, the shatterproof coating 4060 may be applied to at least a part of the side surface of the second window 4050 to correspond to the illustration of FIGS. 11A, 11B, and 11C.

Figure 12A:
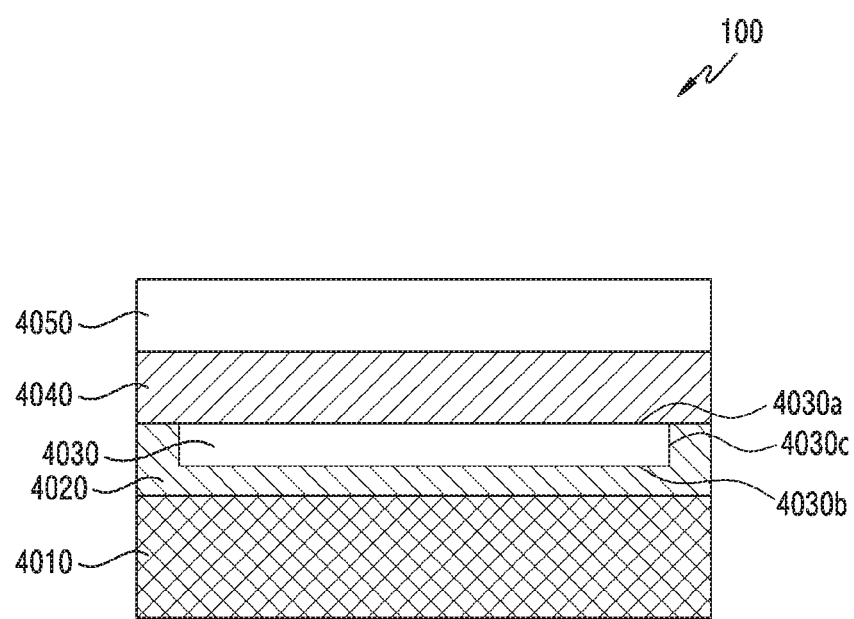
FIG. 12A is a sectional view illustrating an example of the display according to an embodiment.
Figure 12B:
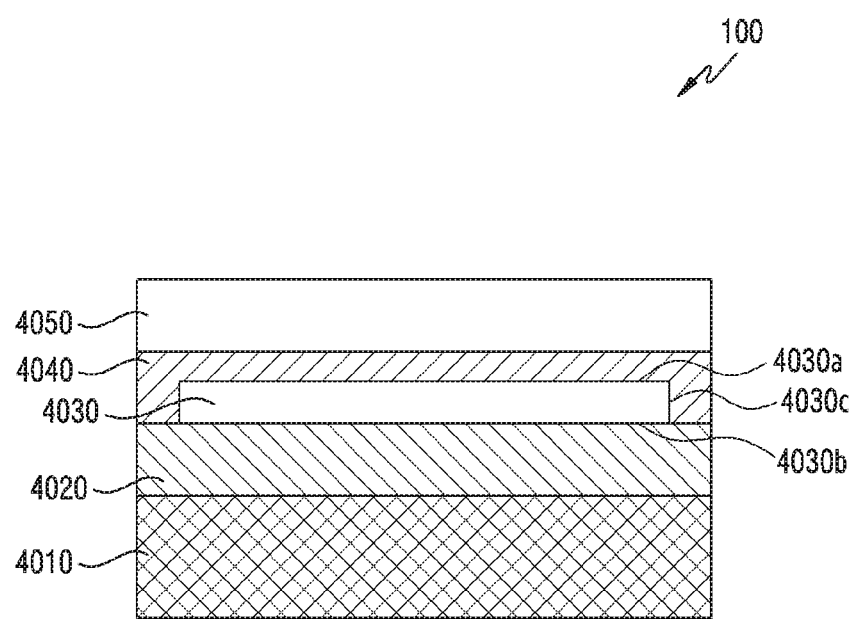
FIG. 12B is a sectional view illustrating an example of the display according to an embodiment.

FIGS. 12A and 12B are sectional illustrating examples of the display 100 according to an embodiment.

Referring to FIG. 12A, the display 100 of the electronic device 10 (e.g., an electronic device 1001) according to an embodiment may include at least one of a display panel 4010, a first adhesive 4020, a first window 4030, a second adhesive 4040, and/or a second window 4050.

The display panel 4010, the first adhesive 4020, the first window 4030, the second adhesive 4040, and the second window 4050 illustrated in FIGS. 12A and 12B may correspond to the display panel 4010, the first adhesive 4020, the first window 4030, the second adhesive 4040, and the second window 4050 illustrated in FIG. 7A, respectively.

In an embodiment, the first adhesive 4020 may be formed on a second surface 4030*b* of the first window 4030. In an embodiment, the first adhesive 4020 may surround the second surface 4030*b* of the first window 4030.

In an embodiment, the first adhesive 4020 may be formed on and surround at least a part of a side surface 4030*c* of the first window 4030. For example, as in FIG. 11A, the first adhesive 4020 may be disposed on a side surface corresponding to the folding region 103 within the side surface 4030*c* of the first window 4030. For another example, as in FIG. 11B, the first adhesive 4020 may surround a region corresponding to the folding region 103 within the side surface 4030*c* of the first window 4030, and a region that extends from the region in a length direction L. In an embodiment, the region extending in the length direction L may be a side surface region that is substantially perpendicular to a folding axis (e.g., the folding axis X of FIG. 8) of the first window 4030 within the side surface 4030c of the first window 4030. For another example, as in FIG. 11C, the first adhesive 4020 may surround the entire side surface 4030c of the first window 4030.

In an embodiment, a resin layer (e.g., PET) for absorbing an external shock applied to the display panel 4010 may be interposed between the first adhesive 4020 and the display panel 4010. In this case, the display 100 according to an embodiment may further include an adhesive layer for adhering the resin layer to the display panel 4010.

Although not illustrated, the display 100 according to an embodiment may include a hard coating (e.g., the hard coating 6010 of FIG. 6A) disposed above the first window 4030. In an embodiment, the hard coating may be replaced by an outer layer including at least one coating. For example, the hard coating may be replaced by one of the outer layers illustrated in FIG. 6B. For another example, the hard coating may be replaced by a plurality of layers that include at least two of the hard coating (e.g., 6010 of FIG. 6A), the anti-fingerprint coating (e.g., 6015 of FIG. 6B), the anti-glare coating (e.g., 6025 of FIG. 6B), the anti-reflection coating (e.g., 6035 of FIG. 6B), and the low-refraction coating (e.g., 6045 of FIG. 6B).

Referring to FIG. 12B, the first adhesive 4020, which surrounds at least a part of the side surface 4030c of the first window 4030, may be replaced by the second adhesive 4040. In this case, the second adhesive 4040 surrounds the side surface 4030c of the first window 4030 in the way corresponding to the first adhesive 4010 described with reference to FIG. 12A, but may be disposed on the first surface 4030a rather than the second surface 4030b of the first window 4030.

Figure 13A:
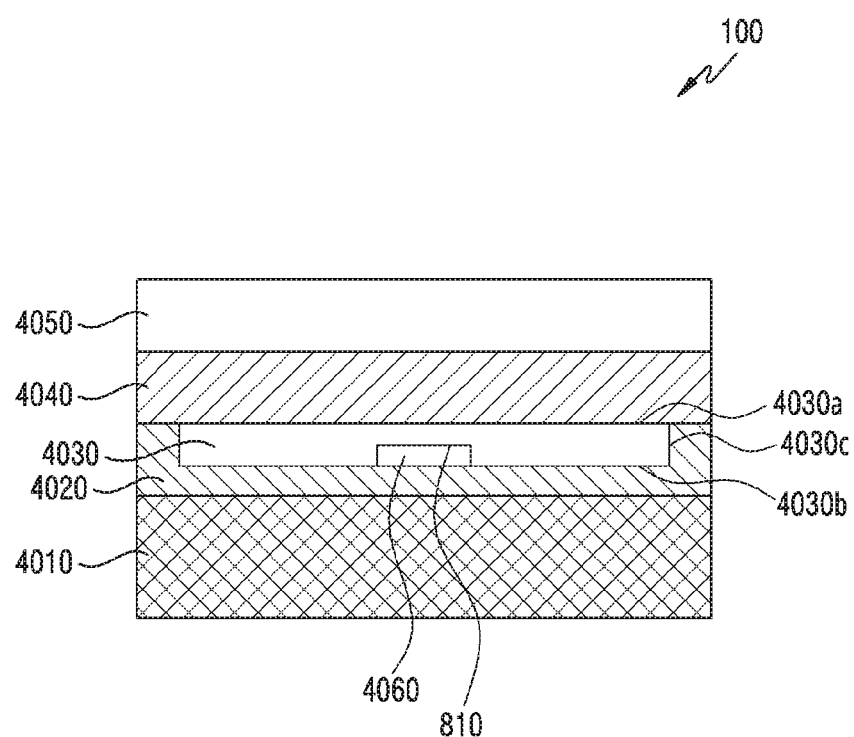
FIG. 13A is a sectional view illustrating an example of the display according to an embodiment.

FIG. 13A is a sectional view illustrating an example of the display 100 according to an embodiment.

Figure 13B:
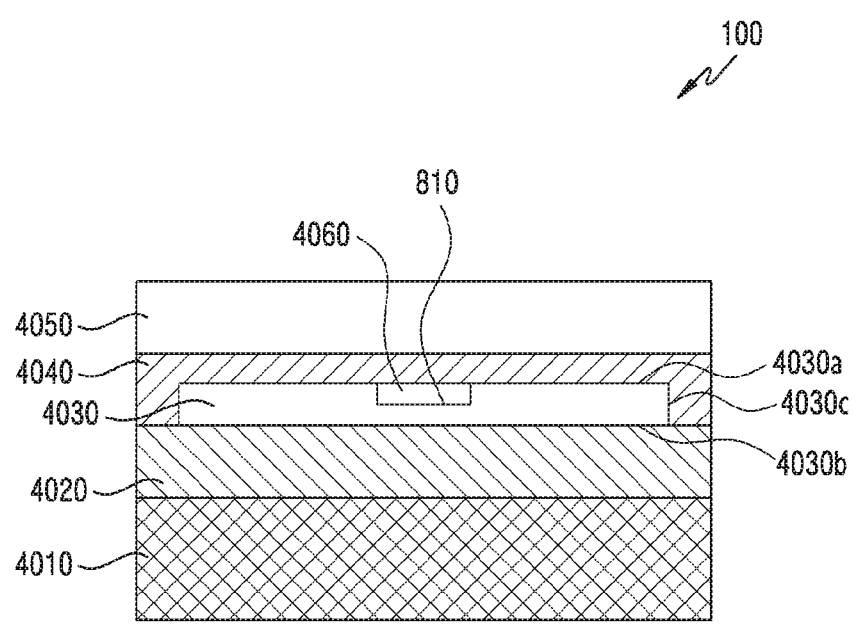
FIG. 13B is a sectional view illustrating an example of the display according to an embodiment.

FIG. 13B is a sectional view illustrating an example of the display 100 according to an embodiment.

Referring to FIG. 13A, the display 100 of the electronic device 10 (e.g., an electronic device 1001) according to an embodiment may include at least one of a display panel 4010, a first adhesive 4020, a first window 4030, a second adhesive 4040, a second window 4050, and/or a shatterproof coating 4060.

The display panel 4010, the first adhesive 4020, the first window 4030, the second adhesive 4040, the second window 4050, and the shatterproof coating 4060 illustrated in FIGS. 13A and 13B may correspond to the display panel 4010, the first adhesive 4020, the first window 4030, the second adhesive 4040, the second window 4050, and the shatterproof coating 4060 illustrated in FIGS. 8 and 9, respectively.

Referring to FIG. 13A, unlike the illustration of FIG. 9, the shatterproof coating 4060 may be disposed in a space formed by a groove 810 of the first window 4030.

In an embodiment, the shatterproof coating 4060 having optical properties identical or similar to those of the first window 4030 is filled in a portion having a different thickness due to the groove 810 of the first window 4030, and thereby a deflection in quality of an image of a screen which penetrates the first window 4030 can be compensated.

In an embodiment, the first adhesive 4020 may be disposed on a surface (e.g., a second surface 4030b) of the first window 4030 in which the groove 810 is formed. In an embodiment, the shatterproof coating 4060 fills up the space formed by the groove 810 of the first window 4030. Thereby, the second surface 4030b of the first window 4030 can be uniformly formed, and the first adhesive 4020 can maintain a reliably adhered state to the first window 4030.

In an embodiment, the description given with reference to FIGS. 12A and 12B may be equally applied to the description of the first adhesive 4020. For example, the first adhesive 4020 may surround at least a part of the side surface 4030c of the first window 4030.

Although not illustrated, in an embodiment, a resin layer (e.g., PET) for absorbing an external shock applied to the display panel 4010 may be interposed between the first adhesive 4020 and the display panel 4010. In this case, the display 100 according to an embodiment may further include an adhesive layer for adhering the resin layer to the display panel 4010.

Although not illustrated, the display 100 according to an embodiment may include a hard coating (e.g., the hard coating 6010 of FIG. 6A) disposed above the first window 4030. In an embodiment, the hard coating may be replaced by an outer layer including at least one coating. For example, the hard coating may be replaced by one of the outer layers illustrated in FIG. 6B. For another example, the hard coating may be replaced by a plurality of layers that include at least two of the hard coating (e.g., 6010 of FIG. 6A), the anti-fingerprint coating (e.g., 6015 of FIG. 6B), the anti-glare coating (e.g., 6025 of FIG. 6B), the anti-reflection coating (e.g., 6035 of FIG. 6B), and the low-refraction coating (e.g., 6045 of FIG. 6B).

Referring to FIG. 13B, the groove 810 of the first window 4030 may be formed in the first surface 4030a. In this case, the first adhesive 4020, which surrounds the side surface 4030c of the first window 4030, may be replaced by the second adhesive 4040.

Figure 14:
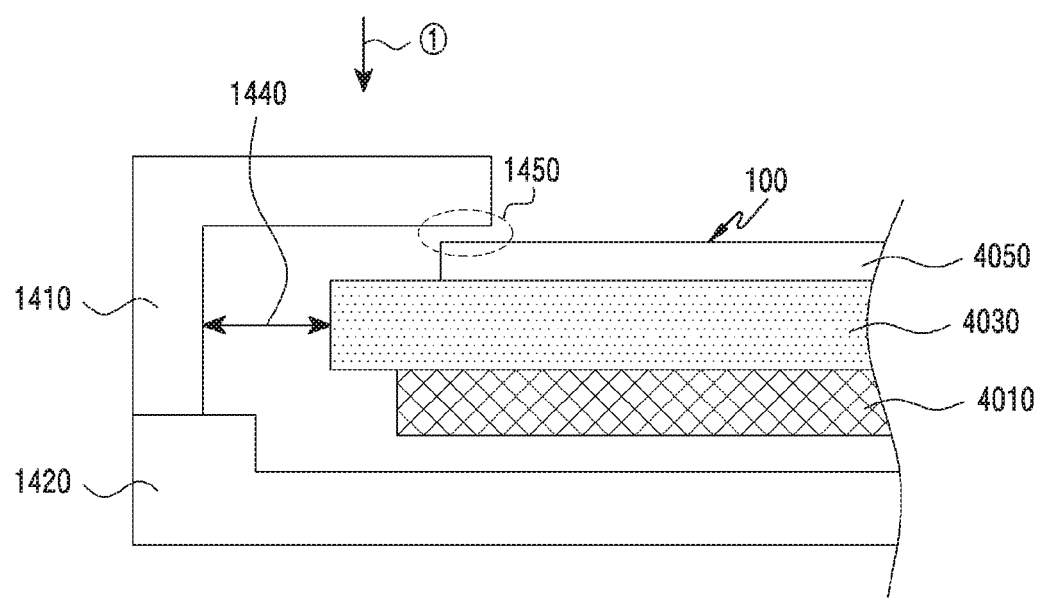
FIG. 14 is a sectional view illustrating an example of the electronic device taken along line B-B' of FIG. 3A.

FIG. 14 is a sectional view of an example electronic device 10 taken along line B-B' of FIG. 3A.

FIG. 14 illustrates a cross section of the first housing structure 510 of FIG. 3A, and a description of FIG. 14 may be equally or correspondingly applied to the second housing structure 520.

Referring to FIG. 14, the electronic device 10 according to an embodiment may include a side surface bezel structure 1410, a bracket 1420, and the display 100.

In an embodiment, the side surface bezel structure 1410 and the bracket 1420 may correspond to the first housing structure 510 and the first rear cover 580 illustrated in FIG. 3A. In an embodiment, the side surface bezel structure 1410 and the bracket 1420 may form a space in which the display 100 is disposed. In an embodiment, the side surface bezel structure 1410 and the bracket 1420 may be formed in a separated structure as illustrated, or may be integrally formed.

In an embodiment, the display 100 may include a display panel 4010, a first window 4030, and a second window 4050, and may be disposed in such a manner that at least a part thereof is housed in the space provided by the side surface bezel structure 1410 and the bracket 1420.

In an embodiment, the display panel 4010, the first window 4030, and the second window 4050 may be correspond to the display panel 4010, the first window 4030, and the second window 4050 described in FIGS. 4A to 13B, respectively. For convenience of description, in the display 100 illustrated in FIG. 14, only the display panel 4010, the first window 4030, and the second window 4050 are illustrated, and the description given in FIGS. 1 to 13B with reference to the display 100 may be equally or correspondingly applied. For example, the display 100 illustrated in FIG. 14 may include a first adhesive 4020, a second adhesive 4040, and a shatterproof coating 4060 in the way corresponding to the display 100 of FIG. 4A. For another example, the display 100 illustrated in FIG. 14 may include a hard coating 6010 for protecting the display 100 in the way corresponding to the display 100 of FIG. 6A. For another example, the display 100 illustrated in FIG. 14 may include a first adhesive 4020, a shatterproof coating 4060, and a second adhesive 4040 in the way corresponding to the display 100 of FIG. 9, and a groove 810 may be formed in the first window 4030.

In an embodiment, the first window 4030 may be spaced apart from the side surface bezel structure 1410, and a gap 1440 may be formed between the first window 4030 and the side surface bezel structure 1410. The gap 1440 may provide a space in which at least one layer included in the display 100 can move depending on a folding operation of the electronic device 10.

In an embodiment, the first window 4030 may be disposed on the display panel 4010. The first window 4030 may be disposed such that at least a part of a periphery of the first window 4030 is located outside the display panel 4010. For example, at least one periphery of the first window 4030 may be closer to the side surface bezel structure 1410 than the display panel 4010.

In an embodiment, the second window 4050 may be disposed on the first window 4030. The second window 4050 may be disposed such that at least a part of a periphery of the second window 4050 is offset from the periphery of the first window 4030. For example, the second window 4050 may be disposed such that at least a part of the periphery thereof is located inside the periphery of the first window 4030.

In an embodiment, when the electronic device 10 is viewed from above (e.g., in a direction of ⊙), the second window 4050 may partly overlap the side surface bezel structure 1410. In the case where the second window 4050 overlaps the side surface bezel structure 1410, the second window 4050 may be spaced apart from the side surface bezel structure 1410 in the direction of ⊙, and a gap 1450 may be formed between the second window 4050 and the side surface bezel structure 1410.

In another embodiment, unlike the illustration of FIG. 14, when the electronic device 10 is viewed from above (e.g., in the direction of ⊙), the second window 4050 may not overlap the side surface bezel structure 1410.

Figure 15:
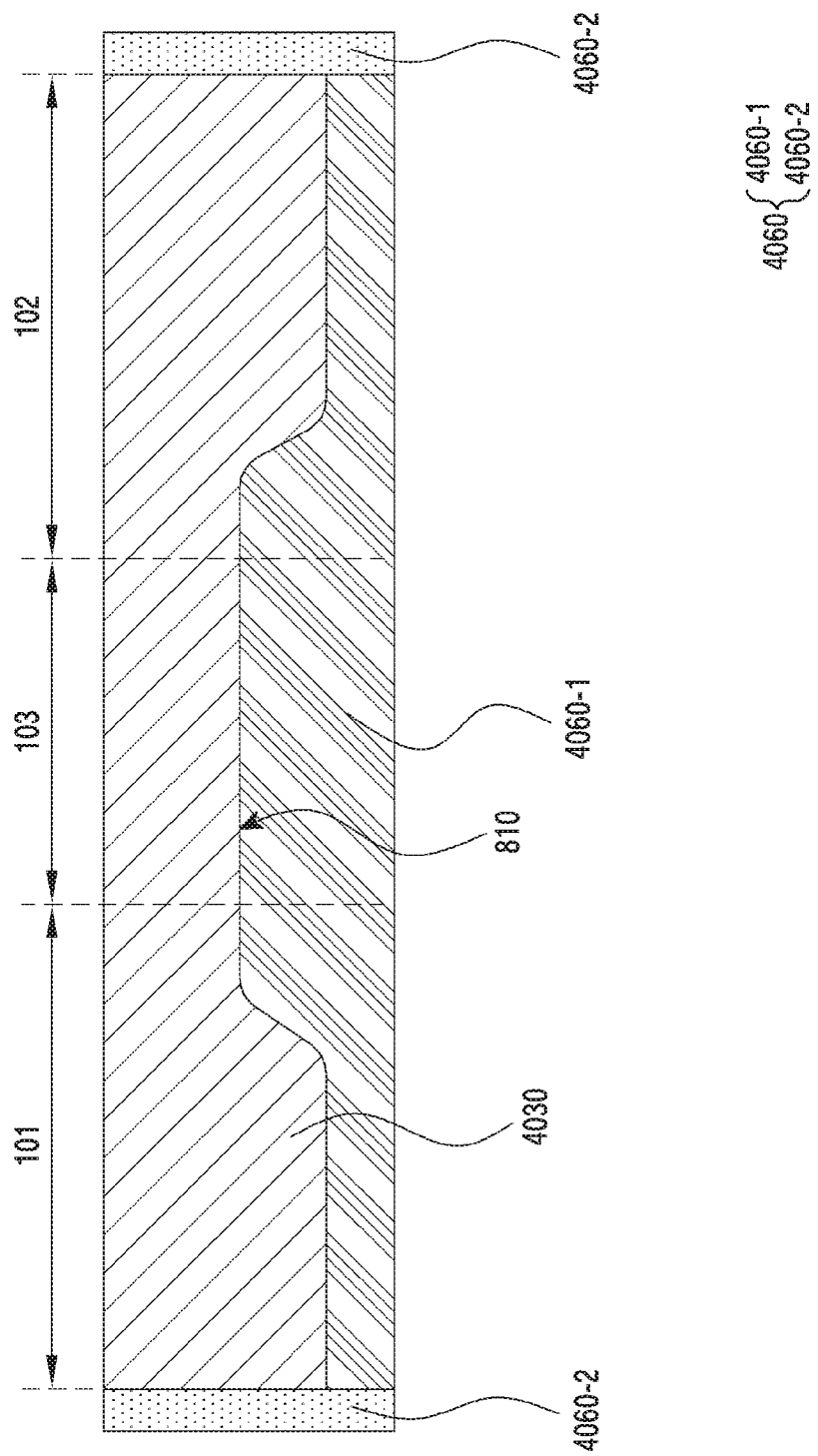
FIG. 15 is a diagram illustrating an example of the first window which the shatter proof coating is provided according to an embodiment.

FIG. 15 is a diagram illustrating an example of the first window 4030 which the shatter proof coating 4060 is provided according to an embodiment.

Referring to FIG. 15, the first window 4030 according to an embodiment may include the groove 810 formed on one surface thereof. The groove 810 may correspond to the folding region 103. In an embodiment, the groove 810 may be formed over a portion of the first region 101 and a portion of the second region 102 as well as the folding region 103 of the first window 4030. In another embodiment, not shown, the groove 810 may be formed only in the folding region 103 of the first window 4030.

In an embodiment, the shatterproof coating 4060 may include a first portion 4060-1 and a second portion 4060-2. In an embodiment, the first portion 4060-1 of the shatterproof coating 4060 may be disposed on a surface of the first window 4030 in a manner that fills the groove 810. The second portion 4060-2 of the shatterproof coating 4060 may be disposed on at least a side surface of the first window 4030. For example, as shown, the second portion 4060-2 of the shatterproof coating 4060 may be disposed in a manner that abuts the side surface of the first window 4030 and the first portion 4060-1 of the shatterproof coating 4060. For another example, the second portion 4060-2 of the shatterproof coating 4060 may be disposed in contact with only the side surface of the first window 4030.

In an embodiment, the first portion 4060-1 may include a different material than the second portion 4060-2. For example, the first portion 4060-1 may include at least one of polysiloxane, an acrylate compound, and/or a photopolymerization initiator, and the second portion 4060-2 may include a resin material, but it is not limited thereto.

In an embodiment, the adhesion (or the adhesive force) of the first portion 4060-1 and the second portion 4060-2 may be different from each other. For example, the adhesion of the second portion 4060-2 may be weaker than the first portion 4060-1. In another embodiment, the adhesion of the first portion 4060-1 and the second portion 4060-2 may be substantially the same as each other.

In one embodiment, at least a first portion 4060-1 of the first portion 4060-1 and/or the second portion 4060-2 has optical properties substantially equal to the first window 4030 (e.g., refractive index). Due to the thickness variation of the first window 4030, which occurs as the groove 810 is formed, a variation in image quality of the screen displayed through the first window 4030 may occur. In an embodiment, the shatterproof coating 4060 including the first portion 4060-1 substantially identical to the optical properties of the first window 4030 may compensate for variations in image quality according to the thickness of the first window 4030.

The description of the first window 4030 described above may be applied to the second window 4050 in the same or corresponding manner. For example, the groove 810 may be formed on a surface of the second window 4050, and the first portion 4060-1 of the shatterproof coating 4060 may be disposed on the surface of the second window 4050. The second portion 4060-2 of the shatterproof coating 4060 may be disposed on a side surface of the second window 4050 in a manner in contact with the second window 4050 and the first portion 4060-1.

As described above, the electronic device (e.g., the electronic device 10 of FIG. 3A) according to an example embodiment may include a deformable display panel (e.g., the display panel 4010 of FIG. 4A), a first window (e.g., the first window 4030 of FIG. 4A) disposed on the deformable display panel, a first adhesive (e.g., the first adhesive 4020 of FIG. 4A) disposed between the deformable display panel and the first window, a second window (e.g., the second window 4050 of FIG. 4A) disposed on the first window and including a first surface, a second surface opposite the first surface, and a side surface disposed between the first surface and the second surface, a second adhesive (e.g., the second adhesive 4040 of FIG. 4A) disposed between the first window and the second window, and a shatterproof coating (SPC) (e.g., the shatterproof coating 4060 of FIG. 4A) provided at least a part of the side surface of the second window and the first surface of the second window.

In an example embodiment, the first window may include a recess (e.g., the recess 810 of FIG. 8) formed in the first surface, and the shatterproof coating may be applied to the first surface while filling up the recess.

In an example embodiment, the first window may include a folding region (e.g., the folding region 103 of FIG. 8) that corresponds to a region in which the display panel is deformed, and the recess may be formed along the folding region. The shatterproof coating may be applied to at least an area of the side surface that corresponds to the folding region.

In an example embodiment, the second window may include ultra thin glass (UTG), and the first window may include at least one of polyimide (PI), polyethylene terephthalate (PET), polyurethane (PU), or cellulose triacetate (TAC).

In an example embodiment, a portion of the second window in which the recess is provided may include at least one stepped portion or at least one curved portion.

In an example embodiment, the recess may extend along the folding region.

In an example embodiment, a thickness of a portion of the second window in which the recess is provided may be thinner than other portion of the second window, and a refractive index of the SPC may be substantially identical to the second window so as to compensate for a difference in quality of an image displayed through the second window according to a difference in thickness of the second window.

In an example embodiment, the SPC may not include a shatterproof film.

In an example embodiment, the first adhesive may be disposed between the deformable display panel and a portion of the SPC provided on the second window.

As described above, the electronic device (e.g., the electronic device 10 of FIG. 3A) according to an embodiment may include a deformable display panel (e.g., the display panel 4010 of FIG. 7A), a first window (e.g., the first window 4030 of FIG. 7A) disposed on the deformable display panel and including a first surface, a second surface opposite the first surface, and a side surface disposed between the first surface and the second surface, a first adhesive (e.g., the first adhesive 4020 of FIG. 7A) disposed between the deformable display panel and the first window, a shatterproof coating (SPC) (e.g., the shatterproof coating 4060 of FIG. 7A) provided on at least a part of the side surface of the first window and the first surface of the first window, a second window disposed on the first window, and a second adhesive (e.g., the second adhesive 4040 of FIG. 7A) disposed between the first window and the second window.

In an example embodiment, the first window may include a recess (e.g., the recess 810 of FIG. 8) formed in the first surface, and the shatterproof coating may be applied to the first surface while filling up the recess.

In an example embodiment, the first window may include a folding region (e.g., the folding region 103 of FIG. 8) corresponding to a region in which the display panel is deformed, and the recess may be formed in the folding region. The shatterproof coating may be applied to at least an area of the side surface that corresponds to the folding region.

In an example embodiment, a portion of the first window in which the recess is provided may include at least one stepped portion or at least one curved portion.

In an example embodiment, the recess may extend along the folding region.

In an example embodiment, a thickness of a portion of the first window in which the recess is provided may be thinner than other portion of the first window, and a refractive index of the SPC may be substantially identical to the first window so as to compensate for a difference in quality of an image displayed through the first window according to a difference in thickness of the first window.

In an example embodiment, the SPC may not include a shatterproof film.

In an example embodiment, the first adhesive may be disposed between the deformable display panel and a portion of the SPC provided on the first window.

As described above, the electronic device according to an embodiment may include at least partially deformable display panel, a first window disposed on the display panel and including a first surface, a second surface facing the first surface, and a side surface extending from an edge of the first surface to an edge of the second surface, the first window including a recess formed on the first surface, a first adhesive interposed between the display panel and the first window, a second window disposed on the first window, a second adhesive interposed between the first window and the second window, and a shatterproof coating (SPC) applied on the first surface and at least portion of the side surface.

In an example embodiment, the display panel may include a first region, a second region, and a folding region that is disposed between the first region and the second region and is deformable, and the recess may correspond to the folding region.

In an example embodiment, the SPC may be applied to at least portion of the side surface of the first window corresponding the folding area.

In an example embodiment, the recess may extend along the folding region.

In an example embodiment, a portion of the first window where the recess is formed may be thinner than another portion.

In an example embodiment, the SPC may have a refractive index that is substantially the same as that of the first window so as to compensate for a difference in image quality of the screen passing through the first window according to a difference in thickness of the first window.

In an example embodiment, a portion of the first window where the recess is formed may include at least one of at least one stepped portion or at least one curved portion.

In an example embodiment, the first adhesive may be interposed between the display panel and a portion of the SPC surrounding the first surface.

In an example embodiment, the second adhesive may be interposed between the second window and a portion of the SPC surrounding the first surface.

In an example embodiment, the electronic device may further include a hard coating applied on the second window.

In an example embodiment, the electronic device may further include an anti-fingerprint coating applied on the hard coating, an anti-glare coating applied on the hard coating, an anti-reflection coating applied on the hard coating, or a low-refraction coating applied on the hard coating.

In an example embodiment, the SPC may not include a shatterproof film, and may be formed by directly applying an shatterproof coating solution on the at least portion of the side surface and the first surface.

As described above, a portable communication device (e.g., the electronic device 10 of FIG. 3A) according to an embodiment may include a housing (e.g., the foldable housing 500 of FIG. 3A) and a flexible display (e.g., the display 100 of FIG. 3A) accommodated in the housing, wherein the flexible display may include a flexible display panel (e.g., the display panel 4010 of FIG. 4A), and a glass window (e.g., the first window 4030 or the second window 4050) positioned on the flexible display panel, and including an upper surface, a lower surface, and a side surface, and a coating layer, wherein the coating layer may be formed at least a portion of the side surface and at least one of the upper surface and the lower surface to prevent or reduce shattering of the glass window by impact from outside of the portable communication device, deformation of the flexible display, or flaws formed in the side surface.

In an example embodiment, the coating layer may be located substantially over an entire area of the side surface.

In an example embodiment, the flexible display may further include a polymer layer positioned above the coating layer.

In an example embodiment, the flexible display may further include a polymer layer positioned under the coating layer.

In an example embodiment, the polymer layer may include PI (polyimide), PET (polyethylene), PU (polyurethane) or TAC (cellulose triacetate).

In an example embodiment, the flexible display may further include a first adhesive interposed between the display panel and the glass window.

In an example embodiment, the flexible display may further include a second adhesive positioned above the first adhesive.

In an example embodiment, adhesion of the second adhesive may be less than that of the first adhesive.

In an example embodiment, a thickness of the second adhesive may be less than that of the first adhesive.

In an example embodiment, the glass window may include UTG (ultra thin glass).

In an example embodiment, the coating layer may be formed the at least a portion of the side surface and the lower surface, and the flexible display may further include an outer coating layer formed above the upper surface.

In an example embodiment, the coating layer may be formed the at least a portion of the side surface, the upper surface, and the lower surface, and the flexible display may further include an outer coating layer formed above the coating layer.

In an example embodiment, the outer coating layer may include at least one of an anti-fingerprint coating, an anti-glare coating), an anti-reflection coating) and/or a low-refraction coating).

In an example embodiment, the coating layer may be formed directly on the at least a portion of the side surface and the at least one of the upper surface or the lower surface.

In an example embodiment, the coating layer may be formed on the at least a portion of the side surface and the at least one of the upper surface or the lower surface without an adhesive member contacting the coating layer and at least a portion of the glass window.

In an example embodiment, the coating layer may be formed on the at least a portion of the side surface to cover flaws of the side surface.

As described above, the flexible display (e.g., the display 100) according to an embodiment may include a display panel (e.g., the display panel 4010), a glass window (e.g., the first window 4030 or the second window 4050) disposed on the display panel, and including a top surface, a bottom surface, and a side surface, and a coating layer (e.g., the shatterproof coating 4060), wherein the coating layer may be formed on at least a portion of the side surface and at least one of the top surface or the bottom surface to reduce shattering of the glass window by external impact.

In the above-described example embodiments of the disclosure, a component included in the disclosure is expressed in the singular or the plural according to a presented example embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been illustrated and described with reference to various example embodiments thereof, it will be understood by those skilled in the art that various changes in form and details may be made therein without departing from the scope of the disclosure, including the appended claims and equivalents thereof.

What is claimed is:

1. An electronic device comprising:
a deformable display panel;
a first window disposed on the deformable display panel;
a first adhesive disposed between the deformable display panel and the first window;
a second window disposed on the first window, the second window including a first surface facing away from a surface of the deformable display panel from which light is emitted, a second surface opposite the first surface and facing the surface of the deformable display panel from which light is emitted, and a side surface disposed between the first surface and the second surface, wherein the first and second windows are both disposed on a same side of the deformable display panel;
a second adhesive disposed between the first window and the second window; and
a shatterproof coating (SPC) provided on at least a part of the side surface and the entire first surface of the second window.

2. The electronic device of claim 1, wherein:
the second window includes a recess in the first surface; and
the shatterproof coating is provided on the first surface of the second window and fills the recess.

3. The electronic device of claim 2, wherein:
the second window includes a folding region corresponding to a region in which the display panel is configured to be deformed;
the recess is provided in the folding region; and
the shatterproof coating is provided on at least an area of the side surface corresponding to the folding region.

4. The electronic device of claim 1, wherein a shape of the side surface includes a curvature.

5. The electronic device of claim 1, wherein a shape of the side surface includes a chamfered shape.

6. The electronic device of claim 1, wherein:
the shatterproof coating is provided to surround the first surface of the second window, the second surface of the second window, and the side surface of the second window; and
the second adhesive is disposed between the first window and a portion of the shatterproof coating surrounding the second surface.

7. An electronic device comprising:
a deformable display panel;
a first window disposed on the deformable display panel;
a first adhesive disposed between the deformable display panel and the first window;
a second window disposed on the first window, the second window including a first surface, a second surface opposite the first surface, and a side surface disposed between the first surface and the second surface;
a second adhesive disposed between the first window and the second window;
a shatterproof coating (SPC) provided on at least a part of the side surface and the first surface; and a strength reinforcement coating provided on a part of the side surface of the second window and the second surface of the second window,
wherein the shatterproof coating is provided on a remaining part of the side surface of the second window and the first surface of the second window, and
the second adhesive is disposed between the first window and a portion of the strength reinforcement coating provided on the second surface of the second window.

8. The electronic device of claim 1, wherein the shatterproof coating is directly provided on at least a part of the side surface of the second window and the first surface of the second window without an adhesive.

9. The electronic device of claim 1, wherein:
the second window includes glass; and
the first window includes at least one of polyimide (PI), polyethylene terephthalate (PET), polyurethane (PU), or cellulose triacetate (TAC).

10. The electronic device of claim 1, wherein:
the deformable display panel is configured to be deformed based on folding of the electronic device; and
the shatterproof coating is provided on the first surface of the second window, and a portion of the side surface of the second window which is substantially perpendicular to an axis of the folding.

11. An electronic device comprising:
a deformable display panel;
a first window disposed on the deformable display panel, the first window including a first surface facing away from a surface of the deformable display panel from which light is emitted, a second surface opposite the first surface and facing the surface of the deformable display panel from which light is emitted, and a side surface disposed between the first surface and the second surface;
a first adhesive disposed between the deformable display panel and the first window;
a shatterproof coating (SPC) provided on at least a part of the side surface of the first window and the entire first surface of the first window;
a second window disposed on the first window, wherein the first and second windows are both disposed on a same side of the deformable display panel; and
a second adhesive disposed between the first window and the second window.

12. The electronic device of claim 11, wherein:
the first window includes a recess in the first surface of the first window; and
the shatterproof coating is provided on the first surface of the first window and fills the recess.

13. The electronic device of claim 12, wherein:
the first window includes a folding region corresponding to a region in which the display panel is configured to be deformed;
the recess is in the folding region; and
the shatterproof coating is provided on at least an area of the side surface of the first window corresponding to the folding region.

14. The electronic device of claim 11, wherein the second adhesive is disposed between the second window and a portion of the shatterproof coating provided on the first surface of the first window.

15. The electronic device of claim 11, wherein the shatterproof coating is directly provided on at least a part of the side surface of the first window and the first surface of the first window without an adhesive.

16. The electronic device of claim 11, further comprising a hard coating provided on the second window,
wherein the electronic device further comprises at least one of:
an anti-fingerprint (AF) coating provided on the hard coating;
an anti-glare (AG) coating provided on the hard coating;
an anti-reflection (AR) coating provided on the hard coating; or
a low-refraction (LR) coating provided on the hard coating.

17. The electronic device of claim 11, wherein:
the deformable display panel is configured to be deformed based on folding of the electronic device; and
the shatterproof coating is provided on the first surface of the first window, and a portion of the side surface of the first window which is substantially perpendicular to an axis of the folding.

18. The electronic device of claim 11, further comprising a strength reinforcement coating provided on a part of the side surface of the first window and the second surface of the first window,
wherein the shatterproof coating is provided on a remaining part of the side surface of the first window and the first surface of the first window.

19. The electronic device of claim 18, wherein the first adhesive is disposed between the first window and a portion of the strength reinforcement coating provided on the second surface.

20. The electronic device of claim 11, wherein:
the first window includes glass; and
the second window includes at least one of polyimide (PI) or polyethylene terephthalate (PET).

* * * * *